US012625246B2

(12) United States Patent
Sahin et al.

(10) Patent No.: US 12,625,246 B2
(45) Date of Patent: May 12, 2026

(54) CONTINUOUS-PHASE MODULATION BASED POWER-EFFICIENT TUNABLE JOINT RADAR/COMMUNICATIONS SYSTEM

(71) Applicants: University of Kansas, Lawrence, KS (US); Government of the United States, as represented by the Secretary of the Air Force, Wright-Patterson AFB, OH (US)

(72) Inventors: Cenk Sahin, Oakwood, OH (US); Patrick M. McCormick, Fairborn, OH (US); Justin G. Metcalf, Norman, OK (US); John Jakabosky, Alexandria, VA (US); Shannon David Blunt, Shawnee, KS (US); Erik S. Perrins, Lawrence, KS (US)

(73) Assignees: University of Kansas, Lawrence, KS (US); The United States of America as Represented by the Secretary of the Air Force, Washington, DC (US)

( * ) Notice: Subject to any disclaimer, the term of this patent is extended or adjusted under 35 U.S.C. 154(b) by 451 days.

(21) Appl. No.: 17/761,326

(22) PCT Filed: Sep. 18, 2020

(86) PCT No.: PCT/IB2020/058731
§ 371 (c)(1),
(2) Date: Mar. 17, 2022

(87) PCT Pub. No.: WO2021/053614
PCT Pub. Date: Mar. 25, 2021

(65) Prior Publication Data
US 2022/0350009 A1 Nov. 3, 2022

Related U.S. Application Data

(60) Provisional application No. 62/903,615, filed on Sep. 20, 2019.

(51) Int. Cl.
*G01S 13/32* (2006.01)
*G01S 7/00* (2006.01)
(Continued)

(52) U.S. Cl.
CPC ............ *G01S 13/325* (2013.01); *G01S 7/006* (2013.01); *G01S 2013/9316* (2020.01)

(58) Field of Classification Search
CPC .................. G01S 13/325; G01S 7/006; G01S 2013/9316; G01S 13/765; G01S 13/825;
(Continued)

(56) References Cited

U.S. PATENT DOCUMENTS

| | | | | |
|---|---|---|---|---|
| 6,081,226 A | * | 6/2000 | Caldwell | G01S 13/106 342/204 |
| 2019/0227143 A1 | * | 7/2019 | Lindenfeld | G01S 13/582 |

(Continued)

FOREIGN PATENT DOCUMENTS

WO     WO-2019166429 A1     9/2019

OTHER PUBLICATIONS

Rawat, D. B. et al. Dynamic Spectrum Access for Wireless Networks. Switzerland: Springer International Publishing, 2015, 83 pages.

(Continued)

*Primary Examiner* — Vladimir Magloire
*Assistant Examiner* — Remash R Guyah
(74) *Attorney, Agent, or Firm* — Norton Rose Fulbright US LLP

(57) ABSTRACT

Systems, methods, and computer-readable storage media for generating and utilizing radar signals with embedded data are disclosed. Data is encoded onto a CPM waveform, which is then combined with a base radar waveform to produce a radar-embedded communication (REC) waveform. Both the CPM waveform and the base radar waveform may have a
(Continued)

100 continuous phase and constant envelope, resulting in the REC waveform having a continuous phase and constant envelope. The changing (e.g., on a pulse-to-pulse basis) nature of the REC waveform causes RSM of clutter which may result in residual clutter after clutter cancellation, decreasing target detection performance of the radar system. In an aspect, various parameters may be utilized to dynamically adjust the performance of the radar system for a particular operating scenario, such as to enhance radar signal processing or enhance data communication capabilities.

20 Claims, 14 Drawing Sheets

(51) Int. Cl.
  *G01S 13/931* (2020.01)
  *G01S 13/34* (2006.01)

(58) Field of Classification Search
  CPC .......... G01S 13/06; G01S 13/347; G01S 7/00;
      G01S 13/34; H04L 27/2626; H04L 27/26
  USPC ........................................................ 342/145
  See application file for complete search history.

(56) References Cited

U.S. PATENT DOCUMENTS

2019/0227144 A1    7/2019  Lin et al.
2019/0235050 A1    8/2019  Maligeorgos et al.
2020/0256948 A1*   8/2020  Jansen ..................... G01S 13/34
2020/0348389 A1*  11/2020  Laghezza .............. G01S 13/584

OTHER PUBLICATIONS

Anderson, J. B. et al. Digital Phase Modulation. New York, NY: Springer, 1986, 509 pages.
W. L. Melvin and J. A. Scheer, eds., Principles of Modern Radar: Advanced Techniques. Edison, NJ: SciTech Publishing, 2013, Section 2.2, Stretch Processing, 17 pages.
J. G. Proakis et al. Digital Communications. New York, NY: McGraw-Hill, 2008, Section 3.2-2 Phase Modulation, 4 pages.
Molisch, A. F. Wireless Communications. West Sussex, UK: John Wiley & Sons Ltd., 2011, Section 18.2.4, Effects of Multipath Propagation on Code Division Multiple Access, 5 pages.
Ma, D. et al. "Joint Radar-Communication Strategies for Autonomous Vehicles: Combining Two Key Automotive Technologies," IEEE Signal Processing Magazine, vol. 37, No. 4, Jul. 2020, 22 pages.
Aydogdu, C. et al. "Radar Interference Mitigation for Automated Driving: Exploring Proactive Strategies," IEEE Signal Processing Magazine, vol. 37, No. 4, Jul. 2020, 24 pages.
Blunt, S. et al.. "Polyphase-Coded FM (PCFM) Radar Waveforms, Part II: Optimization," IEEE Transactions on Aerospace and Electronic Systems, vol. 50, No. 3, Jul. 2014, 12 pages.
Patent Cooperation Treaty, International Search Report and Written Opinion issued for PCT Application No. PCT/IB2020/058731, dated Feb. 8, 2021, 7 pages.
Griffiths, H. et al. "Radar Spectrum Engineering and Management: Technical and Regulatory Issues," Proc. IEEE, vol. 103, No. 1, 2015, 29 pages.
Zhao, Q. et al. "A Survey of Dynamic Spectrum Access: Signal Processing and Networking Perspectives," IEEE Signal Process. Mag., vol. 24, No. 3, pp. 79-89, May 2007, 11 pages.
Sturm, C. et al. "An OFDM System Concept for Joint Radar and Communications Operations," IEEE 69th Vehicular Tech. Conf., Apr. 2009, 5 pages.

Blunt, S. D. et al. "Embedding Information into Radar Emissions via Waveform Implementation," 2010 International Waveform Diversity and Design Conf., Aug. 2010, 5 pages.
Chen, X. et al. "A Novel Radar Waveform Compatible with Communication," 2011 International Conf. on Comp. Problem-Solving, Oct. 2011, 5 pages.
Nowak, M. et al. "Co-Designed Radar-Communication Using Linear Frequency Modulation Waveform," IEEE Aerosp. Electron. Syst. Mag., vol. 31, No. 10, Oct. 2016, 8 pages.
Sahin, C. et al. "A Novel Approach for Embedding Communication Symbols into Physical Radar Waveforms," 2017 IEEE Radar Conference, May 2017, 6 pages.
Ravenscroft, B. et al. "Tandem-Hopped OFDM Communications in Spectral Gaps of FM Noise Radar," 2017 IEEE Radar Conference, May 2017, 6 pages.
McCormick, P. M. et al. "Simultaneous Radar and Communications Emissions from a Common Aperture, Part I: Theory," 2017 IEEE Radar Conference, May 2017, 6 pages.
O'Donoughue, N. A. "Analysis of Dual-Transmit Beams," 2017 IEEE Radar Conference, May 2017, 6 pages.
McCormick, P. M. et al. "Physical Waveform Optimization for Multiple-Beam Multifunction Digital Arrays," 2018 52nd Asilomar Conference on Signals, Systems, and Computers, Oct. 2018, 6 pages.
Sahin, C. et al. "Power-Efficient Multi-Beam Phase-Attached Radar/Communications," 2019 IEEE Radar Conference, Apr. 2019, 6 pages.
Sahin. C. et al. "Embedding Communications into Radar Emissions by Transmit Waveform Diversity," in Radar & Communication Spectrum Sharing, S.D. Blunt and E.S. Perrins, eds. IET, 2018, 58 pages.
Sahin, C. et al. "Characterization of Range Sidelobe Modulation Arising from Radar-Embedded Communications," 2017 International Conference on Radar Systems, Oct. 2017, 6 pages.
Sahin, C. et al. "Reduced Complexity Maximum SINR Receiver Processing for Transmit-Encoded Radar-Embedded Communications," 2018 IEEE Radar Conference, Apr. 2018, 6 pages.
Sahin, C. et al. "Filter Design to Address Range Sidelobe Modulation in Transmit-Encoded Radar-Embedded Communications," 2017 IEEE Radar Conference, May 2017, 6 pages.
Sahin, C. et al. "Experimental Validation of Phase-Attached Radar/Communication (PARC) Waveforms: Radar Performance," 2018 International Conference on Radar, Aug. 2018, 6 pages.
Hemmingsen, D. M. et al. "Waveform-Diverse Stretch Processing," 2018 IEEE Radar Conference, Apr. 2018, 6 pages.
Viterbi, A. J. "Error Bounds for Convolutional Codes and an Asymptotically Optimum Decoding Algorithm," IEEE Trans. Inf. Theory, vol. 13, No. 2, Apr. 1967, 10 pages.
Polyanskiy, Y. et al. "Channel Coding Rate in the Finite Blocklength Regime," IEEE Trans. Inf. Theory, vol. 56, No. 5, May 2010, 53 pages.
Sahin, C. et al. "On the Symmetric Information Rate of CPM in the Finite Blocklength Regime," 2015 IEEE Military Communications Conference, Oct. 2015, 5 pages.
Harnett, L. et al. "Optimal and Adaptive Mismatch Filtering for Stretch Processing," 2018 IEEE Radar Conference, Apr. 2018, 5 pages.
McCormick, P. M. et al. "FMCW Implementation of Phase-Attached Radar-Communications (PARC)," 2019 IEEE Radar Conference, 6 pages.
Sahin, C. et al. "Optimized Stretch Processing Compensation for FMCW Phase-Attached Radar-Communications," 2019 IEEE International Radar Conference, Sep. 2019, 5 pages.
Metcalf, J. G. et al. "Analysis of Symbol Design Strategies for Intrapulse Radar-Embedded Communications," IEEE Transactions on Aerospace and Electronic Systems, vol. 51, No. 4, Oct. 2015, 43 pages.

* cited by examiner

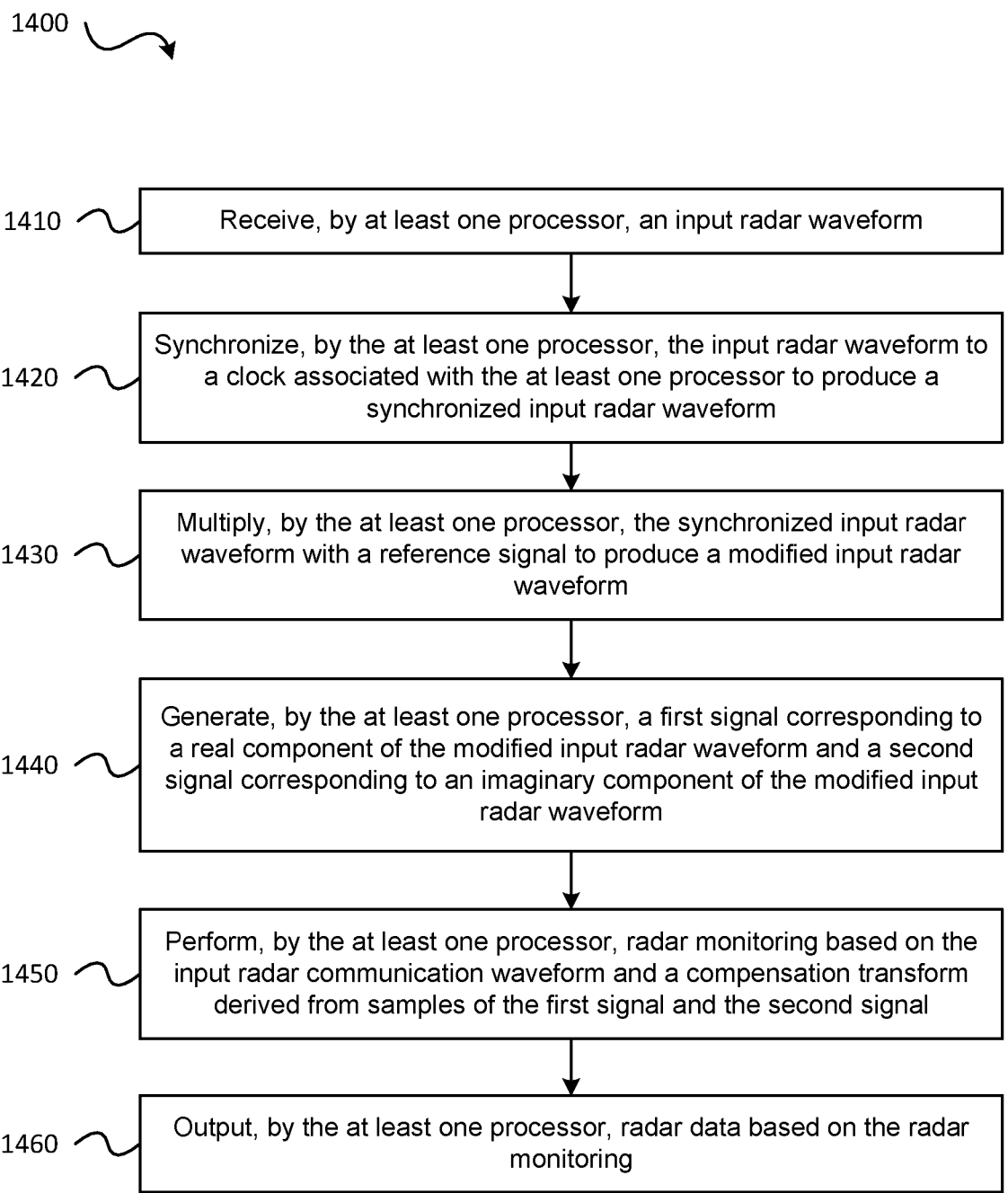

1400

1410   Receive, by at least one processor, an input radar waveform

1420   Synchronize, by the at least one processor, the input radar waveform to a clock associated with the at least one processor to produce a synchronized input radar waveform 1430   Multiply, by the at least one processor, the synchronized input radar waveform with a reference signal to produce a modified input radar waveform 1440   Generate, by the at least one processor, a first signal corresponding to a real component of the modified input radar waveform and a second signal corresponding to an imaginary component of the modified input radar waveform 1450   Perform, by the at least one processor, radar monitoring based on the input radar communication waveform and a compensation transform derived from samples of the first signal and the second signal 1460   Output, by the at least one processor, radar data based on the radar monitoring

1510 — Receive, by at least one processor, an input radar waveform

1520 — Synchronize, by the at least one processor, the input radar waveform to a clock associated with the at least one processor to produce a synchronized input radar waveform 1530 — Extract, by the at least one processor, the CPM communication waveform from the synchronized input radar waveform 1540 — Process, by the at least one processor, the extracted CPM communication waveform to obtain the data of the CPM communication waveform

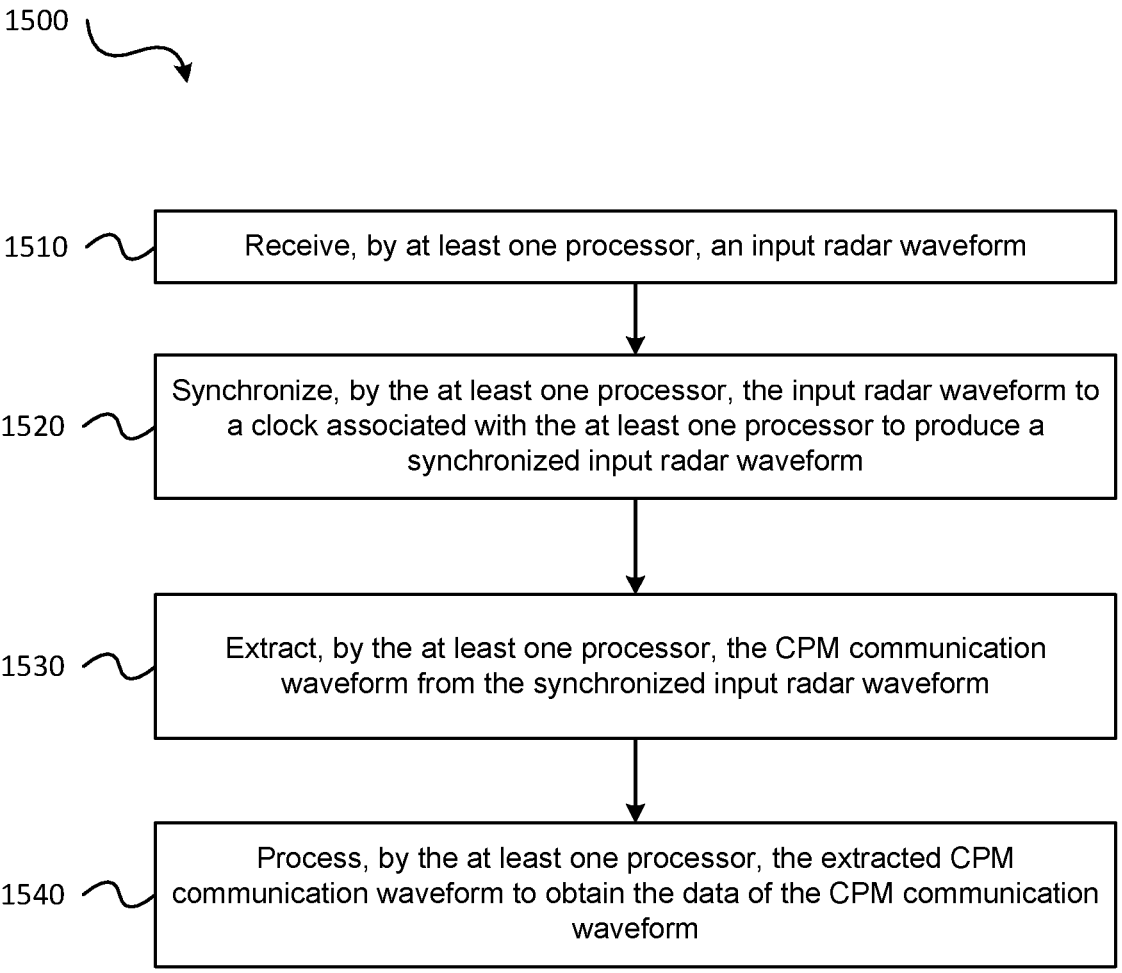

FIG. 15

CONTINUOUS-PHASE MODULATION BASED POWER-EFFICIENT TUNABLE JOINT RADAR/COMMUNICATIONS SYSTEM

CROSS-REFERENCE TO RELATED APPLICATIONS

This application is a national phase application under 35 U.S.C. § 371 of International Application No. PCT/IB2020/058731 filed Sep. 18, 2020, which claims priority to U.S. Provisional Patent Application No. 62/903,615 filed Sep. 20, 2019. The entire contents of each of the above-referenced disclosures is specifically incorporated by reference herein without disclaimer.

GOVERNMENT INTEREST

This invention was made with government support under Grant Nos. FA9550-17-D-0001 and FA8650-14-D-1722 awarded by the United States Air Force. The government has certain rights in the invention.

TECHNICAL FIELD

The present disclosure is related to the design and processing of joint radar and communications waveforms. More specifically, the present disclosure is related to improved techniques for both embedding of communication symbols into physical radar waveforms and the processing of said waveforms.

BACKGROUND

The radio spectrum is a fixed resource with an exponentially increasing demand from commercial communication applications. To meet the increased demand for commercial communication applications, the radar spectrum has been eroded, which has created additional strain on defense applications that must already operate in congested and contested environments. As such, improving spectral efficiency (e.g., dynamic spectrum access) or developing methods to share spectrum between multiple functions (e.g., radar and communication sharing spectrum) has been the subject of ongoing research.

Generally speaking, spectrum sharing can take two forms: cohabitation or co-design. The former tends primarily to address the interference that separately operated systems could cause to one another and the latter involves cooperative control within the same system. At first glance, communications and radar may appear to be similar. However, successful communication requires maximizing the entropy embedded in the transmitted waveform while radar waveforms require coherent, restrictive forms to maximize detection performance. Thus, a dual-function system that performs radar and communication simultaneously involves a performance trade-off between these functions.

Approaches that utilize time-sharing or frequency subbanding may be suitable for some applications; however, the notion of radar/communication spectrum sharing necessitates the use of some manner of waveform diversity. As a general principle, waveform diversity involves the exploitation of the available time, frequency, coding, spatial, and polarization degrees-of-freedom. For example, other work has examined the embedding of low probability of intercept (LPI) communications into radar clutter, using a small set of different radar waveforms where each represents a different communication symbol, modulating a communication signal onto the spatial sidelobes of a radar beam, using fourth Generation (4G) communication signals to also serve as short-range radar emissions for automotive applications, dual radar/communication emissions from a common transmit aperture, tandem hopping of communications within spectral gaps of the radar emission, and phase-modulating a linear FM (LFM) waveform.

As is the case with most radar applications, some communication systems require spectrally contained symbols with high power efficiency (e.g., aeronautical telemetry). To meet this need, a family of constant envelope signaling schemes was developed, collectively denoted as continuous-phase modulation (CPM). The continuous phase feature of CPM signals leads to high spectral efficiency while the constant envelope feature translates to robustness against the distortion introduced by non-linear components in the transmitter (e.g., the power amplifier). As a result, the transmitter power amplifier can be operated in saturation such that the available power is efficiently converted into radiated power. Due to its favorable features, CPM is used in the Bluetooth wireless standard and two variants of shaped-offset quadrature phase-shift keying (SOQPSK) modulation, a type of CPM, are standardized for military applications (SOQPSK-MIL) and aeronautical telemetry (SOQPSK-TG).

Maintaining both power efficiency and spectral efficiency is of great interest for radar systems to maximize "energy on target" and to limit the spectral roll-off for sufficient spectral containment. A CPM-based framework was utilized to implement arbitrary polyphase radar codes as physically realizable continuous frequency modulated (FM) waveforms. The polyphase-coded FM (PCFM) implementation resulted in significantly superior spectral containment compared to derivative phase-shift keying (DPSK) and minimum-shift keying (MSK) implementations. It was subsequently demonstrated that the resulting FM waveform can be optimized via a determination of an underlying optimal code.

Additionally, the notion of pulse agility (or waveform agility), in which the radar waveform is allowed to change on a pulse-to-pulse basis, has been examined as a means to incorporate a communication function into the radar emission, where the set of possible waveforms serves as a communication symbol alphabet. The primary issue with varying the radar waveform during a coherent processing interval (CPI) is the clutter range sidelobe modulation (RSM) that arises because the pulse compression of different waveforms leads to different sidelobe structures. When Doppler processing is carried out across the CPI of pulsed echoes, the presence of RSM induces a partial loss of coherency, the consequence of which is increased residual clutter after cancellation and degraded target visibility. A filter design to mitigate RSM for a given set of waveforms was developed using an iterative joint least squares (JLS) algorithm; however, this approach was only suitable for transmitting 1-2 bits per pulse (e.g., 1-2 kilobits per second (kbps)) because the performance diminishes as the number of waveforms increases. A closed form solution for the JLS approach for moving target indication (MTI) radar was developed, but was likewise only suitable for low data rates.

SUMMARY

Systems, methods, and computer-readable storage media for generating and utilizing radar signals with embedded data are disclosed. In an aspect, a PCFM radar waveform, which is constant for each pulse, may be used as a base radar waveform. For each pulse, data is encoded onto a CPM waveform, which is then combined with the base radar waveform in phase to produce a radar-embedded communication (REC) waveform. For each pulse, the CPM waveform is multiplied to the base radar waveform to generate the REC waveform and because both the CPM waveform and the base radar waveform have a continuous phase and constant envelope, the REC waveform also has a continuous phase and constant envelope. The REC waveform may be passed through a radar front-end, where the REC waveform is modulated onto a carrier, bandpass filtered, amplified, and emitted by an antenna.

The time-varying (e.g., from pulse-to-pulse) nature of the REC waveform, which is caused by embedding data of the CPM waveform in the base radar waveform, may impede radar signal processing. To overcome this problem, embodiments may implement filtering techniques to compensate for the changes to the base radar waveform caused by embedding the CPM waveform in the base radar waveform. In an aspect, the filtering techniques may utilize mismatch filtering to bring the range responses of the pulse-to-pulse varying REC waveforms closer together, which causes the responses to mimic systems that only utilize the base radar waveform. The filtering techniques may reduce the signal-to-noise ratio (SNR), but the impact of the SNR reduction may be negligible compared to prior approaches that involved embedding data communications in radar waveforms.

The changing (e.g., on a pulse-to-pulse basis) nature of the REC waveform causes RSM of clutter which may result in residual clutter after clutter cancellation, which may decrease target detection performance of the radar system. In an aspect, various parameters may be utilized to dynamically adjust the severity of RSM, and thus the performance of the radar system for a particular operating scenario, such as to enhance radar signal processing or enhance data communication capabilities.

Stretch processing may be utilized to process received REC waveforms in order to enhance radar detection operations. In an aspect, a data communication receiver may utilize the base radar waveform to filter and/or extract the CPM waveform from samples of a received REC waveform. This allows the data encoded within the CPM waveform to be obtained via traditional processing techniques (e.g., as if the data was transmitted in the CPM waveform directly). Embodiments disclosed herein further provide optimization of stretch processing operations and parameters to further improve performance of the radar system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 14 is a flow diagram illustrating an exemplary method for performing radar detection using FMCW PARC radar-communication waveforms in accordance with embodiments; and FIG. 15 is a flow diagram illustrating an exemplary method for performing data reception using FMCW PARC radar-communication waveforms in accordance with some embodiments.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
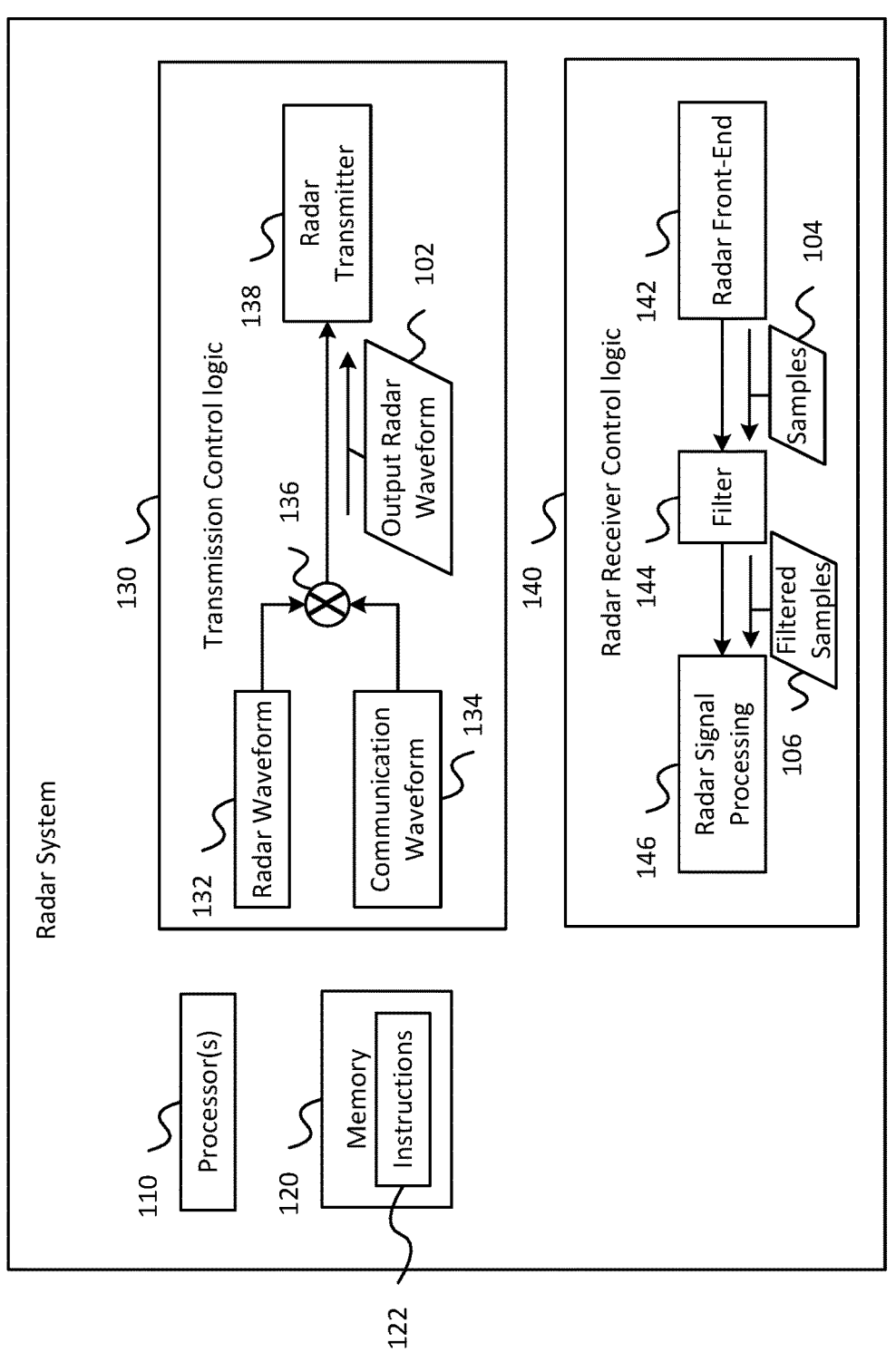
FIG. 1 is a block diagram of a system for performing radar monitoring using radar waveforms that include embedded data in accordance with the present disclosure.

Referring to FIG. 1, a block diagram of a system for performing radar monitoring using radar waveforms that include embedded data in accordance with the present disclosure is shown as a system 100. As described in more detail below, the system 100 may be configured to generate and transmit radar waveforms that include data embedded within the radar waveforms (e.g., REC waveforms). The transmitted radar waveforms may be utilized to perform radar monitoring, which may include tracking movement of a target of interest, such as, but not limited to, an aircraft. In addition to utilizing the transmitted radar waveforms to perform radar monitoring, one or more remote systems or devices may receive and process the transmitted radar waveforms to receive the data embedded therein. Additional details regarding reception of data embedded in the radar waveforms are described with reference to FIG. 2.

As shown in FIG. 1, the system 100 may include one or more processors 110, a memory 120, transmission control logic 130, and radar receiver control logic 140. Each of the one or more processors 110 may be a digital signal processor (DSP), a central processing unit (CPU), and/or graphics processing unit (GPU) having one or more processing cores or other computing circuitry (e.g., a microcontroller, one or more application specific integrated circuits (ASICs), field programmable gate arrays (FPGAs), and the like). The memory 120 may include read only memory (ROM) devices, random access memory (RAM) devices, one or more hard disk drives (HDDs), flash memory devices, solid state drives (SSDs), network attached storage (NAS) devices, other devices configured to store data in a persistent or non-persistent state, or a combination of different memory devices. The memory 120 may store instructions 122 that, when executed by the one or more processors 110, cause the one or more processors 110 to perform operations for generating and transmitting radar waveforms that include embedded data and for performing radar monitoring based on received signals associated with the transmitted radar waveforms, such as reflections of the transmitted radar waveforms, as described herein. Additionally, the instructions 122, when executed by the one or more processors 110, may cause the one or more processors 110 to present one or more graphical user interfaces to a user. The one or more graphical user interfaces may present various types of information to a user, such as information associated with radar monitoring of a target of interest. Additionally, the one or more graphical user interfaces may present options that enable the user to customize the configuration of the transmitted radar waveforms, such as to configure parameters that allow the user to tune the transmitted radar waveforms such that radar monitoring activities are prioritized or data communications are prioritized.

Figure 3:
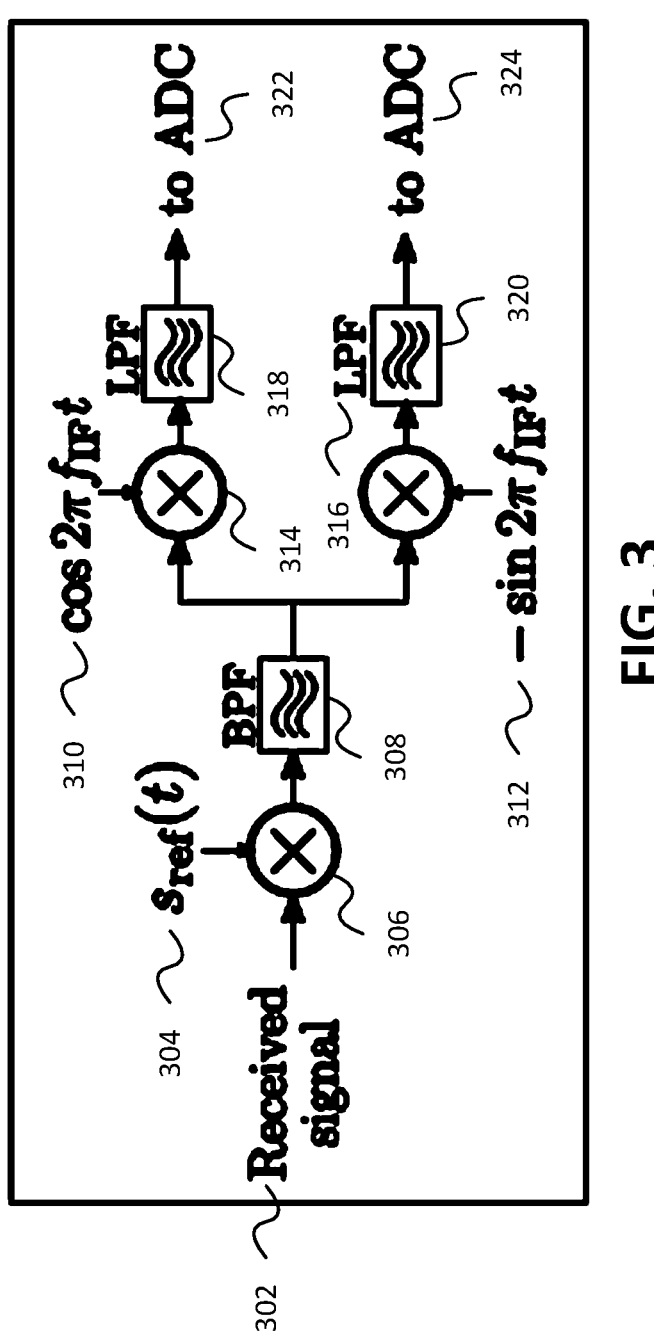
FIG. 3 is a block diagram illustrating exemplary processing logic for performing stretch processing of FMCW PARC waveforms.

The transmission control logic 130 may be configured to generate an output radar waveform with embedded data in accordance with aspects of the present disclosure. As illustrated in FIG. 1, a radar waveform 132 and a communication waveform 134 may be generated. In an aspect, the radar waveform 132 may be generated by converting a discrete polyphase radar code into a continuous-phase FM waveform. For example, a polyphase radar code may be given by $$\bar{\theta} = [\bar{\theta}_0, \dots , \bar{\theta}_{N_c}],$$

where $N_c$ denotes the number of chips per pulse and $$|\bar{\theta}_{n_c}| \le \pi$$

for all $n_c = 0, \dots , N_c$. In FIG. 3, the sequence $$\bar{\alpha} = [\bar{\alpha}_1, \dots , \bar{\alpha}_{N_c}], |\bar{\alpha}_{n_c}| \le \pi$$

for all $n_c = 1, \dots , N_c$, denotes the phase changes between successive chips of $\ddot{\theta}$ and may be referred to as the PCFM code, where $\ddot{\alpha}$ may be derived from $\ddot{\theta}$ as follows:

$$\ddot{\alpha}_{n_c} = \ddot{\theta}_{n_c} - \ddot{\theta}_{n_c-1}$$

for $1 \le n_c \le N_c$.

The overline notation ($\bar{\cdot}$) is used with $\ddot{\theta}$ and $\hat{\alpha}$ to emphasize that both sequences remain the same from pulse to pulse. The length $N_c$ train of impulses, with the $n_c$-th impulse scaled by $$\bar{\alpha}_{n_c},$$

may be convolved with a shaping filter $g(t)$ and later integrated to produce the continuous phase of the radar waveform, which may be denoted by:

$$\psi(t; \bar{\alpha}) = \int_0^t g(\tau) * \left[ \sum_{n_c=1}^{N_c} \bar{\alpha}_{n_c} \delta(\tau - (n_c - 1)T_c) \right] d\tau + \ddot{\theta}_0 \qquad \text{(Equation 1)}$$

where $T_c$ is the time duration of the chip interval, * denotes convolution, and $\ddot{\theta}_0$ is the initial phase value. The shaping filter $g(t)$ has time support $[0, T_c]$, and the area under $g(t)$ is unity. The resulting PCFM radar waveform (e.g., the radar waveform 132 of FIG. 1) of time duration $T = N_c T_c$ may be expressed as:

$$s(t; \bar{\alpha}) = \sqrt{P_t} \, e^{j\psi(t; \bar{\alpha})} \qquad \text{(Equation 2)}$$

7 where $P_t$ is the transmit power, $s(t;\ddot{\alpha})$ refers to the base radar waveform, and $e^{j\psi(t;\ddot{\alpha})}$ is a complex number/function with phase value/function $\psi(t;\ddot{\alpha})$ defined in Equation 1.

In addition to generating the radar waveform 132, which may be a continuous-phase FM waveform, the transmission control logic may generate a communication waveform, which may be a waveform utilized to embed data into the radar waveform 132. For example, consider a communication symbol sequence $\beta=[\beta_1,\ldots,\beta_{N_s}]$ drawn from an M-ary symbol alphabet $\{\pm1, \pm3, \ldots, \pm(M-1)\}$, where $N_s$ is the number of symbols per pulse and $M=2^m$, with m representing the number of bits per symbol. The symbol sequence $\beta$ is modulated as a CPM waveform with a symbol interval $T_s$ and the communication shaping filter g(t) resulting in a signal phase $\phi(t;\beta)$ given by:

$$\phi(t;\beta) = h\pi \int_0^t g_c(\tau) * \left[\sum_{n_s=1}^{N_s} \beta_{n_s}\delta(\tau - (n_s-1)T_s)\right]d\tau \quad \text{(Equation 3)}$$

where $$h = \frac{k}{p}$$

is the modulation index and k and p are mutually prime integers. It is noted that the modulation index h may be used to control the magnitude of the total phase change due to a communication symbol transmission while the magnitude of the maximum phase change is $h\pi(M-1)$ according to the M-ary symbol alphabet. The communication shaping filter $g_c(t)$ has time duration $LT_s$, with L being a positive integer and the area under $g_c(t)$ is unity. When L=1, the CPM signal may be said to be full-response; otherwise (i.e., L>1) it may be said to be partial-response. Partial-response CPM generally results in superior spectral containment at the expense of increased communication receiver complexity. In the description that follows, full-response CPM is considered. The signal phase $\phi(t;\beta)$ has the same duration (pulsewidth $T=N_cT_c$) as the base radar waveform. It follows that the chip duration and the communication symbol duration are related by:

$$\frac{T_s}{T_c} = \frac{N_c}{N_s} \quad \text{(Equation 4)}$$

In an aspect, the communication symbol duration may be increased or decreased to achieve a decreased or increased symbol rate for a given base radar waveform (i.e., for a fixed $N_c$ and $T_c$).

To transmit the communication sequence $\beta$ within a radar emission, the transmission control logic 130 may phase attach the signal phase $\phi(t;\beta)$ to the base radar waveform $s(t;\ddot{\alpha})$ via a combiner 136 to produce an information-bearing continuous-phase radar/communication waveform 102, which may be expressed as:

$$\Im(t;\overline{\alpha},\beta) = \sqrt{P_t}\, e^{j[\psi(t;\overline{\alpha})+\phi(t;\beta)]} \quad \text{(Equation 5)}$$

The output radar waveform 102 may be an information-bearing continuous-phase radar/communication waveform (e.g., a REC waveform) and once generated, may be provided to a radar transmitter 138 for transmission. The radar transmitter 138 may one or more amplifiers, modulation circuitry, a bandpass filter, an antenna, and the like. Once received by the radar transmitter 138, the output radar waveform 102 may be amplified, modulated onto a carrier, bandpass filtered, and emitted by the antenna.

In an aspect, the combiner 136 may be configured to attach the signal phase $\phi(t;\beta)$ to the base radar waveform $s(t;\ddot{\alpha})$ by combining the two waveforms in phase. It is noted that $\beta$ is a random communication sequence and $\ddot{\alpha}$ is a fixed PCFM radar code. The base radar waveform $s(t;\ddot{\alpha})$ maintains a degree of similarity among the set of changing waveforms in the CPI that may be uniquely specified by the modulation index h, the communication symbol alphabet size M, and the symbol duration $T_s$.

In addition, the total communication component duration $N_sT_s$ may be configured to be smaller than the radar pulsewidth $T=N_cT_c$. Since the radar/communication waveforms are non-identical only for the duration of the communication component, this strategy would make the communication-embedded radar waveforms more similar.

The radar receiver control logic 140 may be configured to perform processing of input radar waveforms for radar monitoring, such as to track movement of one or more target of interest. For example, the radar receiver control logic 140 may include a radar front-end 142 configured to receive input radar waveforms, which may correspond to echoes of the output radar waveforms transmitted by the radar transmitter 138. The radar front-end 142 may also synchronize the input radar waveforms (e.g., with respect to time and/or frequency). In an aspect, one or more clocks (or clock circuitry) may be utilized to synchronize the input radar waveforms. Once synchronized, the radar front-end 142 may sample the received input radar waveforms to produce one or more samples 104. The one or more samples 104 may be provided to a filter block 144, which may be configured to generate one or more filtered samples 106. Filter block 144 may be configured to bring a sample closer to the base radar waveform utilized to generate the REC waveform prior to transmission. In an aspect, the filter block 144 may be configured to generate the one or more filtered samples 106 using a matched filtering technique, a mismatched filtering technique, or a combination of matched and mismatched filtering techniques, as described in more detail below. The filtered samples 106 may be provided to a radar signal processing module 146 configured to process the filtered samples for performing radar monitoring operations, such as tracking a target of interest. For example, the radar signal processing module 146 may be configured to implement Doppler processing techniques to remove clutter and identify the targets of interest (e.g., moving targets).

As shown above, aspects of the present disclosure provide improved techniques to embed communication symbols into radar emissions. Additionally, aspects of the present disclosure enable parameters utilized by systems configured in accordance with the present disclosure to be tuned to prioritize and/or enhance a desired mode of operation, which allows for a trade-off between radar performance and communication performance via the adjustable parameters while still maintaining high power and spectral efficiency. For chirp-like radar waveforms, the spectral broadening arising from this form of communication embedded radar can be addressed with the use of guard symbols. Also, it has been observed that REC waveforms generated in accordance with the present disclosure have achieved data rates between 100 kps and 5 megabits per second (mbps), depending on the particular tuning of the system parameters. Such data rates provide a significant improvement over previous attempts to develop dual-use radar/communication systems, which had low data rates (e.g., 2-3 kbps).

The dual-function radar and communication waveforms described above are generated by phase-attaching a communication waveform to a base radar waveform. As such, the above-described dual-function radar-communication waveforms may be referred to as phase-attached radar-communications (PARC). More specifically, the above-described PARC waveforms enable the radar waveform to be changed from pulse-to-pulse and may be referred to as pulsed-PARC waveforms.

In the description that follows, additional exemplary techniques for generating PARC-type waveforms are described. These additional exemplary techniques may be utilized to generate dual-function co-designed PARC in which a single, frequency modulated (FM) waveform is generated through a summation of two continuous phase structures, which allows the radar phase structure to remain unchanged over a coherent processing interval while the communication phase structure may be uniquely generated based on the data to be transmitted. The latter may be implemented via a continuous phase modulation (CPM) framework that is known to be power efficient and well-contained spectrally. The PARC framework has been extensively studied from a pulsed perspective, though in such an arrangement the data throughput is inherently limited by the duty cycle.

A PARC signal or waveform generated according to the present disclosure may be extended to a frequency modulated continuous-wave (FMCW) implementation (denoted as FMCW PARC) where it may also be coupled with stretch processing, which enables the radar function to support large bandwidths and achieve a very fine range resolution. The "always on" and constant-modulus nature of FMCW PARC allows both data throughput and energy on target to be maximized. It may likewise facilitate the incorporation of a data broadcast component into some forms of synthetic aperture radar (SAR).

The unique data embedded in each FMCW radar sweep results in a waveform-agile transmission mode whereby the same sweep is never repeated. However, over a coherent processing interval (CPI), the unchanging radar phase structure maintains a baseline level of coherence, any deviations from which depend on the parameters of the communication phase structure. As described above, the waveform-agile structure produces a range sidelobe modulation (RSM) from sweep to sweep, which subsequently translates into a Doppler smearing of clutter that is not adequately addressed by standard clutter cancellation. However, residual clutter in Doppler due to RSM can be mitigated through appropriate receive filtering, or through modification of communication parameters, such as the data rate or modulation index, as described above.

The original pulsed-PARC structure may be extended for CW operation for a radar function that exhibits a sawtooth wave in instantaneous frequency. When stretch processing is performed (e.g., by a radar receiver or a communication receiver configured to receive FMCW PARC data transmissions in accordance with the present disclosure), the mixer output signal may be modulated by the PARC communication data. A compensation transform (instead of the standard fast Fourier transform (FFT)) may be used to fully compress the data on receive as part of stretch processing for a nonlinear FM transmit scenario where the waveform may be relatively chirp-like. Below, exemplary aspects of applying stretch processing to FMCW PARC are described.

A FMCW PARC signal model (e.g., a passband FMCW PARC waveform) may be defined as:

$$s(t; x) = \cos(\psi_r(t) + \psi_c(t; x)) \qquad \text{(Equation 6)}$$

where $\psi_r(t)$ is the (passband) phase of the radar component and $\psi_c(t;x)$ is the phase of the communication component. The communication phase component may be obtained by modulating an M-ary symbol sequence $x=[x_0 x_1 x_2 \ldots]$ with CPM, where $x_n \in \{\pm 1, \pm 3 \ldots, \pm(M-1)\}$ and $m=\log_2 M$ is the number of bits per symbol. The radar phase component may be defined as the integral of the radar instantaneous frequency $f_r t$ as:

$$\psi_r(t) = 2\pi \int_0^t f_r(\tau)d\tau \qquad \text{(Equation 7)}$$

In Equation 25, the shape of $f_r(\tau)$ may follow a down-chirped sawtooth wave. For the ith sweep of duration $T_{sw}$ the instantaneous frequency may be defined as:

$$f_r(iT_{sw} \le t < (i+1)T_{sw}) = f_0 - \kappa(t - iT_{sw}) \qquad \text{(Equation 8)}$$

where $f_0$ is the starting (passband) frequency and $\kappa = B/T_{SW}$ is the chirp rate for the swept bandwidth (B).

The communication phase component during the ith sweep (i.e., $iT_{sw} \le t < (i+1)T_{sw}$) may expressed as:

$$\psi_c(t; x) = \pi h \int_0^{t^{(i+1)N_c-1}} \sum_{n=0} x_n g(\tau - nT_c)d\tau \qquad \text{(Equation 9)}$$

where $T_c$ is the symbol interval, $$N_c = \frac{T_{sw}}{T_c}$$

is the number of symbols per sweep, h (a rational number) is the CPM modulation index, and g(t) is the CPM shaping filter (also known as a "frequency pulse" in the CPM literature). The communication symbol rate is thus $$B_c = \frac{1}{T_c}$$

symbols/s and the data rate is $mB_c$ bits/s. The CPM parameters h, $T_c$, g(t) and M uniquely specify the spectrum of the communication phase component $\psi_c(t;x)$ and hence the additional receiver bandwidth required to fully capture a given range profile. As such, the CPM parameters may be chosen such that the receiver bandwidth does not significantly increase as a result of embedding the communication symbols. In the description that follows, a full-response CPM with a rectangular shaping filter of duration $T_c$ (and amplitude $1/T_c$), which is also known as continuous phase frequency shift keying (CPFSK), is considered. In addition, the communication symbol sequence may be chosen to be binary, i.e. $x_n = \pm 1$, so that the system performance can be evaluated as a function of h and $T_c$.

From a CPM perspective, the modulation index h may be used as a tunable system parameter that controls the total phase change due to a communication symbol transmission, which occurs over $T_c$. From a radar performance perspective, the modulation index h may be used to control the degree of similarity across the sweep-to-sweep changing radar/communication waveform. The total phase change due to symbol $x_n$ may therefore be expressed as $h\pi x_n$, such that the maximum phase change is $\pm h\pi(M-1)$, which becomes Based on knowledge of the radar signal component $\psi_r(t)$, the communication system parameters, and appropriate channel equalization and synchronization, demodulation at the communication receiver may be performed by multiplying an incident signal y(t) by $\cos(\psi_r(t))$ and $-\sin(\psi_r(t))$ and lowpass filtering, which realizes a complex lowpass equivalent signal:

$$\hat{r}(t; x) = \sqrt{P_{RX}} \exp\{j\psi_c(t; x)\} + \hat{n}(t) \qquad \text{(Equation 10)}$$

The complex lowpass equivalent signal may include real (in-phase) and imaginary (quadrature) components, which may be expressed as:

$$\hat{r}_I(t; x) = \phi_{LPF}\{\cos(\psi_r(t))y(t)\} \qquad \text{(Equation 11)}$$

$$= \phi_{LPF}\{\cos(\psi_r(t))\left(\sqrt{2P_{RX}}\cos(\psi_r(t) + \psi_c(t; x)) + n(t)\right)\}$$

$$\hat{r}_Q(t; x) = \phi_{LPF}\{-\sin(\psi_r(t))y(t)\} \qquad \text{(Equation 12)}$$

$$= \phi_{LPF}\{-\sin(\psi_r(t))\left(\sqrt{2P_{RX}}\cos(\psi_r(t) + \psi_c(t; x)) + n(t)\right)\}$$

$\pm h\pi$ when a binary CPM. For pulsed PARC, it was shown that h also controls the degree of similarity across the pulse-to-pulse changing radar/communication waveforms. This greater similarity translates to enhanced coherence across the sets of range sidelobes in the CPI, and thus reduced clutter RSM. This relationship between the modulation index value and the severity of RMS is expected to hold for the FMCW PARC instantiation as well.

From a communication perspective, FMCW PARC waveforms have some rather unique properties. First, since radar transmitters are high power devices, the communication receive processing (e.g., channel estimation and synchronization) would likely be performed in the high SNR regime.

Second, the transmitted waveforms may be partially known at the communication receiver due to the presence of the baseline radar component, which enables the communication receive processing to exploit the structure of the transmitted waveforms to perform channel estimation as well as timing, frequency, and phase offset estimation in a decision-directed fashion once initial estimates are obtained. The communication receiver may determine the initial estimates in a data-driven fashion based on transmitted radar-only sweeps (i.e., transmissions that do not contain communication symbols) during one or more predetermined time intervals. Because the radar-only sweeps do not contain communication symbols, the transmitted waveform may become completely known at the communication receiver. It is also important to note that the radar signal component possesses some desirable features from an estimation perspective, such as high Doppler tolerance.

Third, multipath between the radar transmitter and the communication receiver may be resolved at much finer time scales than the communication symbol interval since the received FMCW PARC waveforms may have a much larger bandwidth than the communication signal components. Thus, existing spread spectrum receiver processing approaches (e.g., a Rake receiver) may be applicable due to the large ratio of the received signal bandwidth to the communication bandwidth. Determination of the best approaches for communication channel equalization and synchronization for FMCW PARC waveforms is a topic of ongoing research.

where $\phi_{LPF}\{\bullet\}$ represents the lowpass filtering operation. In equations 11 and 12, $P_{RX}$ represents the received power, n(t) represents a white complex Gaussian noise process with a power spectral density $N_0$, and $\hat{n}(t)$ represents the resulting noise process. An optimal determination of x may then achieved, such as by applying the Viterbi algorithm based on 2v—state trellis, for v the denominator of h. In an aspect, the optimal determination of x may be based on a maximum likelihood sequence detection.

Now, consider a communication receiver located at azimuth angle $\theta_0$ and distance R, and a radar transmitter with peak power $P_{TX}$. The receive power at the communication receiver may be expressed as:

$$P_{RX} = \underbrace{\left(\frac{\lambda^2 G_{RX} P_{TX}}{16\pi^2}\right)}_{\mu} \frac{G_{TX}(\theta_0)}{R^2} \qquad \text{(Equation 13)}$$

where $\lambda$ is the free-space wavelength, $G_{RX}$ is the receive antenna power gain, and $G_{TX}(\theta_0)$ is the transmit antenna power gain for azimuth angle $\theta_0$. The terms other than the transmit power gain and distance may be grouped into the constant $\mu$, which enables the BER of a full-response CPM with a rectangular shaping filter to be approximated as:

$$BER(h, T_c, \theta_0, R, N_0) \approx Q\left(\sqrt{2\mu \frac{T_c G_{TX}(\theta_0)}{R^2 N_0}}\left(1 - \frac{\sin 2h\pi}{2h\pi}\right)\right) \qquad \text{(Equation 14)}$$

where $$Q(x) = \int_x^\infty \frac{1}{\sqrt{2\pi}} \exp\{-t^2/2\} dt.$$

The argument of the square root inside the Q function may be referred to as the effective communication SNR, or simply the effective SNR.

It follows that, from a communication performance perspective, it may be desirable to increase h. Specifically, it can be shown that for small h the effective SNR decreases approximately by a factor of 4 if h is divided by 2 (e.g., a 6 dB loss). Conversely, increasing $T_c$ increases the effective SNR, and hence reduces the BER. However, increasing $T_c$ also reduces the symbol rate $B_c$. If channel coding is employed, the code blocklength should be chosen as large as possible, as doing so increases the maximum achievable coding rate (expressed as the number of information bits per symbol) that satisfies a given probability of decoding error constraint.

Lowering h therefore decreases the maximum achievable coding rate to satisfy a given probability of decoding error constraint. Increasing $T_c$ allows for a higher coding rate, while at the same time reducing the code blocklength given that channel coding is performed over a fixed number of sweeps. Thus, whether increasing $T_c$ actually improves communication performance depends on the particular implementation.

Figure 2:
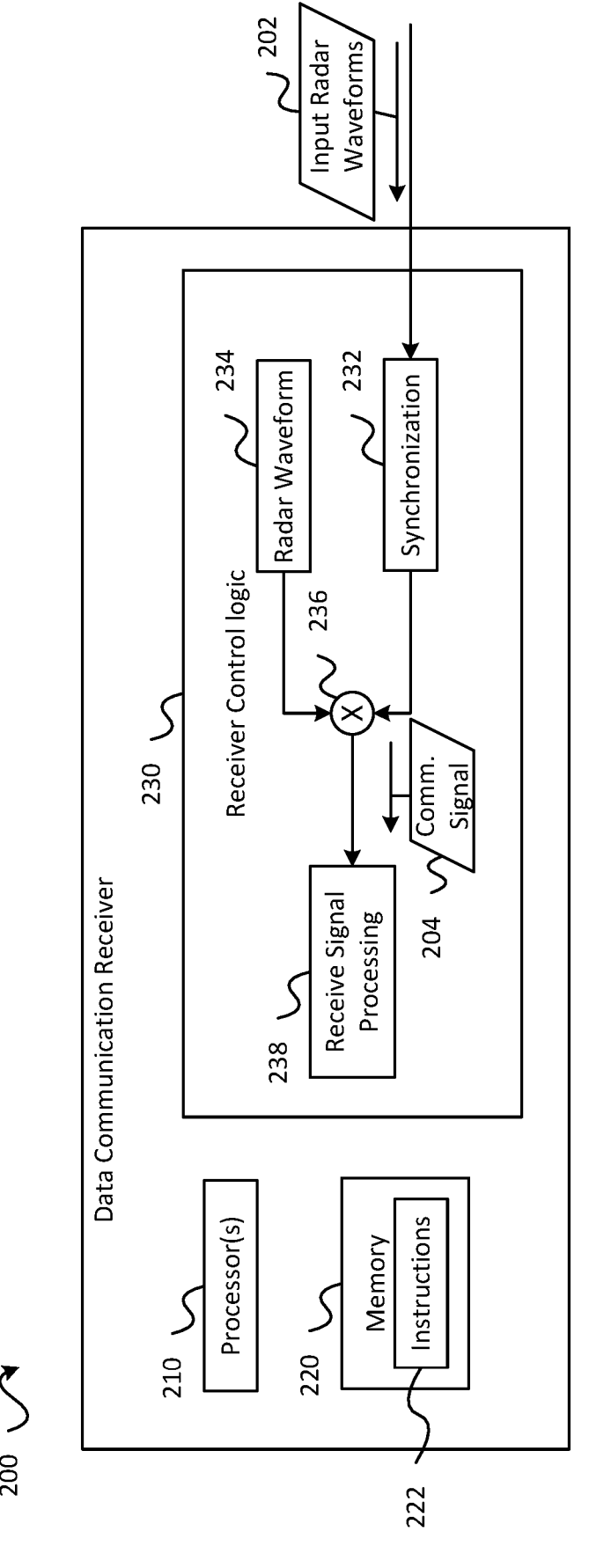
FIG. 2 is a block diagram of a system for receiving data embedded in a radar waveform in accordance with the present disclosure.

Referring to FIG. 2, a block diagram illustrating a data communication receiver configured to extract data from a waveforms generated in accordance with embodiments of the present disclosure is shown as a receiver 200. As shown in FIG. 2, the receiver 200 includes one or more processors 210, a memory 220, and receive control logic 230. The one or more processors 210 may include DSPs, one or more CPUs and/or one or more GPUs each having one or more processing cores, ASICs, FPGAs, or other circuitry configured to process data in accordance with aspects of the present disclosure. The memory 220 may include ROM devices, RAM devices, one or more HDDs, flash memory devices, SSDs, NAS devices, other devices configured to store data in a persistent or non-persistent state, or a combination of different memory devices. The memory 220 may store instructions 222 that, when executed by the one or more processors 210, cause the one or more processors 210 to perform the operations described in connection with the receiver 200.

As shown in FIG. 2, the receiver 200 may receive an input radar waveform 202, which may be a radar waveform including embedded data, such as a waveform generated by the transmission control logic 130 of FIG. 1. The receiver control logic 230 may receive the input radar waveform 202 having embedded data and process the input radar waveform 202 to extract the embedded data. For example, the receiver control logic 230 may include a synchronization module 232, a radar waveform processing module 234, and a receive signal processing module 238. The synchronization module 232 may be configured to determine a synchronization timing associated with the input radar waveform 202 and the radar waveform processing module 234 may be configured to control a de-chirp process applied to the input radar waveform. As shown at block 236, the de-chirp process may be applied (e.g., via a multiplication operation) to the input radar waveform 202 by the radar waveform processing module 234 based on synchronization timing determined by the synchronization module 232 to remove the linear waveform (e.g., the radar portion of the input radar waveform) and extract a communication waveform, shown as communication signal 204 in FIG. 2. Once the communication signal 204 is extracted from the input radar waveform 202, the communication signal 204 may be processed by the receive signal processing module 238 to extract the data that was embedded in the input radar waveform. It is noted that the receive signal processing module 238 may include logic to perform synchronization with respect to the communication signal, as well as logic to perform other signal processing operations to extract the data, such as demodulation, sampling, filtering, etc. It is also noted that the various modules 232, 234, 238 of the receiver control logic 230 may be implemented in hardware or may be implemented as software (e.g., the instructions 222 stored in the memory 220) that is executable by the one or more processors 210.

Referring to FIG. 3, a block diagram illustrating exemplary processing logic for performing stretch processing of FMCW PARC waveforms in accordance with the present disclosure is shown as processing logic 300. The exemplary processing logic 300 illustrated in FIG. 3 enables full in range compression of an FMCW PARC signal using a compensated form of stretch processing recently developed. As shown in FIG. 3, the analog portion of the stretch processing logic may provide an input signal 302 and a standard reference signal ($s_{ref}$(t)) 304 to a mixer 306. The mixer 306 may multiply the received signal with 302 and the reference signal 304 down to an intermediate frequency (IF) ($f_{IF}$), which is subsequently provided to a bandpass filter (BPF) 308 and further mixed down to baseband. The baseband signal may then be multiplied by a first incident signal (e.g., cos $2\pi f_{IF}$t) and a second incident signal (e.g., −sin $2\pi f_{IF}$t) at mixers 314 and 316, respectively, and the resulting signals may be provided to lowpass filters (LPFs) 318 and 320. The LPFs 318 and 320 may provide the resulting low pass filtered signals to analog to digital converters 322 and 324 for further processing.

Given an IF bandwidth $B_{IF}$ and chirp rate κ, the range swath that can be observed after stretch processing may be expressed as:

$$\Delta r = \frac{cB_{IF}}{2\kappa} \qquad \text{(Equation 15)}$$

where c is the speed of light. The particular location of the range swath may be established by time and frequency shifting the reference signal waveform (i.e., the reference signal 304 of FIG. 3) relative to the transmitted signal so that the mixed product falls inside the IF band of the receiver, which may be demarcated by $$\left[ f_{IF} - \frac{B_{IF}}{2}, f_{IF} + \frac{B_{IF}}{2} \right],$$

where these limits correspond to the near and far edges of the range swath and are denoted as $r_{near}$ and $r_{far}$, respectively, with $$\Delta r = r_{far} - r_{near}.$$

For standard stretch processing that employs an LFM waveform, the reference signal $s_{ref}$(t) (e.g., reference signal 304 of FIG. 3) may simply be a time and frequency shifted version of the transmitted waveform. For example, setting $s_{ref}$(t) to be a time/frequency shifted version of cos($\psi_r$(t)) may minimize the difference in frequency between s(t) and $s_{ref}$(t) for all range delays. The time-shift may be defined with respect to an alignment range, $r_a$ (where $r_a$ lies between $r_{near}$ and $r_{far}$) and the reference waveform may be expressed as:

$$s_{ref}(t) = \cos\left( 2\pi f_a \cdot \left( t - \frac{2r_a}{c} \right) + \psi_r\left( t - \frac{2r_a}{c} \right) \right) \qquad \text{(Equation 16)}$$

where $f_a$ is the IF frequency corresponding to range $r_a$ and $$f_a = f_{IF} - \frac{B_{IF}}{2} + \frac{r_a - r_{near}}{\Delta r} B_{IF}$$ (Equation 17)

In equations 16 and 17, the range $r_a$ corresponds to the time delay where the sawtooth structure of the reference signal (e.g., the reference signal 1304 of FIG. 13) and the received signal (e.g., the received signal 302 of FIG. 3) are aligned. After compensated stretch processing (e.g., as described above with respect to FIG. 3), the range $r_a$ may have a high (or highest) signal-to-noise ratio (SNR) and a fine (or finest) range resolution, and thus $r_a$ may represent the range of highest interest for the radar function.

Because of the additional communication component in waveform s(t), the sampled response (per FIG. 3) is not a tonal structure (i.e., a weighted sum of complex sinusoids). As such, the sampled response may not be fully compressed via FFT as is typically applied at the last stage of standard stretch processing. To address this effect for pulsed, nonlinear FM waveforms, sampled responses may be determined at each particular delay and collected into the columns of a matrix that forms a compensation transform.

For scattering at range r, the complex signal response (in the absence of noise) prior to I/Q sampling can be expressed as:

$$p(t, r; x) = \phi_{LPF}\left\{\phi_{BPF}\left\{s_{ref}(t)s\left(t - \frac{2r}{c}; x\right)\right\}\exp(-j2\pi f_{IF}t)\right\}$$ (Equation 18)

where $\phi_{BPF}\{\bullet\}$ represents a bandpass filtering operation (e.g., the bandpass filtering performed at 1308 of FIG. 13), respectively. The response may then be sampled at the receiver sampling rate (denoted $f_s$) for each range bin, normalized as appropriate, and then applied to the sampled data as the matched filter for that particular range.

Processing the data in this manner accounts for the communication-based signal variations in the transmitted waveform at the cost of a modest increase in computational complexity (due to matrix multiplication instead of utilizing more efficient FFT operations). Subsequent Doppler processing across the range compressed sweeps will induce RSM of the clutter due to the sidelobe variations that arise from the changing communication component. It is noted that although the example operations described above utilize matched filtering techniques, mismatched filter formulations may also be employed, as described in more detail below. Accordingly, embodiments of the present disclosure should not be limited to utilizing matched filtering techniques.

Figure 4:
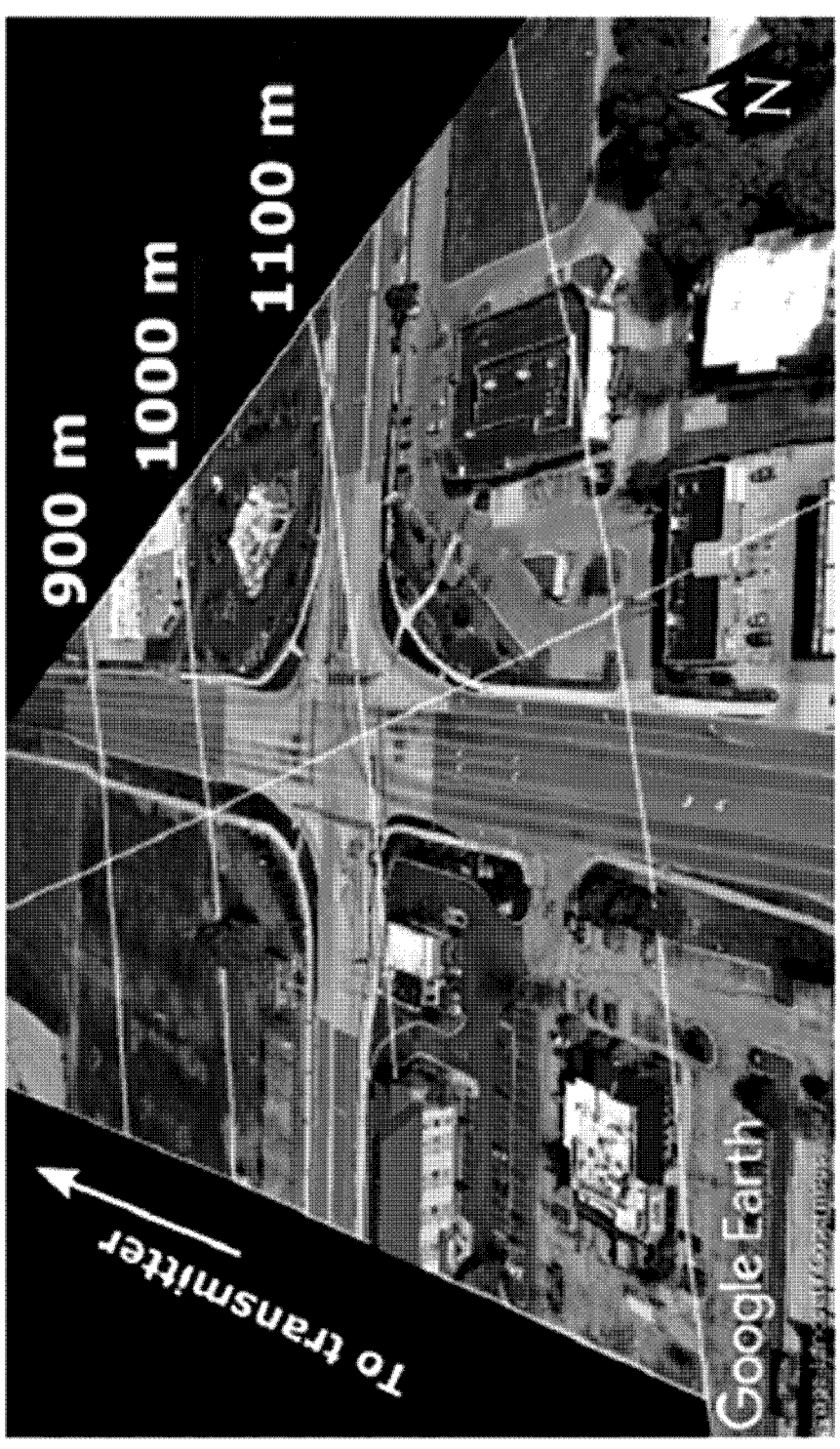
FIG. 4 is an image illustrating a field of view and geometry for an experimental setup configured in accordance with embodiments of the present disclosure.

As shown above, FMCW PARC techniques in accordance with the present disclosure are describe. As described below, FMCW PARC waveforms were tested in an open-air environment to observe the relationship between the radar performance and the CPM communication parameters of modulation index and symbol rate. In these example, the evaluated data product represents the range-Doppler response generated for a traffic intersection in Lawrence, Kansas that is approximately 1.1 km from the collocated transmitter and receiver located on the roof of Nichols Hall at the University of Kansas. FIG. 4 shows the field of view and geometry for the data collection. To collect the test data, two S-band parabolic dish antennas with a half-power beamwidth of 12.3° were used to simultaneously transmit the FMCW PARC waveforms and receive the backscattered response. These waveforms and associated reference signals were generated using a Tektronix AWG70002A arbitrary waveform generator. The backscattered returns (after mixing to IF, as described above with reference to FIG. 3) were then captured using a Rohde and Schwarz FSW 26 real-time spectrum analyzer.

The instantaneous frequency $f_r(t)$ of the radar component of the transmitted FMCW PARC waveform followed a down-chirped sawtooth with starting and ending frequencies of 3.85 GHz and 3.35 GHz, respectively (B=500 MHz bandwidth), for a $T_{SW}$=500 μs sweep time and κ=1 MHz/μs chirp rate. The intermediate frequency was set to $f_{IF}$=300 MHz with $B_{IF}$=40 MHz bandwidth (range swath of $\Delta r$=6000 m). The bandwidth requirements for the receiver were reduced 12.5 times relative to the transmit bandwidth via stretch processing. The near and far ranges were set to $r_{near}$=0 m and $r_{far}$=6000 m, respectively. The alignment range was chosen as $r_a$=1050 m ($f_a$=287 MHz) so that the maximum SNR and finest range resolution were achieved near the middle of the intersection. After the mixing and filtering stages were completed (e.g., the mixing and filtering stages illustrated in FIG. 3), the data was sampled at 50 MHz. A total of 200 sweeps were captured in the CPI for a total duration of 100 ms. The stretch processing parameters are shown in Table 1, below. To facilitate a fair comparison, all test cases were transmitted back-to-back to illuminate the same approximate scene.

TABLE 1

| FMCS Stretch Processing Parameters | | |
|---|---|---|
| Description | Variable | Value |
| FMCW type | — | sawtooth |
| FMCW slope | — | down-chirp |
| Start frequency | $f_0$ | 3.85 GHz |
| Tx bandwidth | B | 500 MHz |
| Sweep time | $T_{sw}$ | 500 μs |
| Chirp rate | κ | 1 MHz/μs |
| Intermediate frequency | $f_{IF}$ | 300 MHz |
| IF bandwidth | $B_{IF}$ | 40 MHz |
| Range swath | $\Delta r$ | 6000 m |
| Near range | $r_{near}$ | 0 m |
| Far range | $r_{far}$ | 6000 m |
| Alignment range | $r_a$ | 1050 m |
| Rx sampling rate | $f_s$ | 50 MHz |
| CPI | — | 100 ms |

Figure 5A:
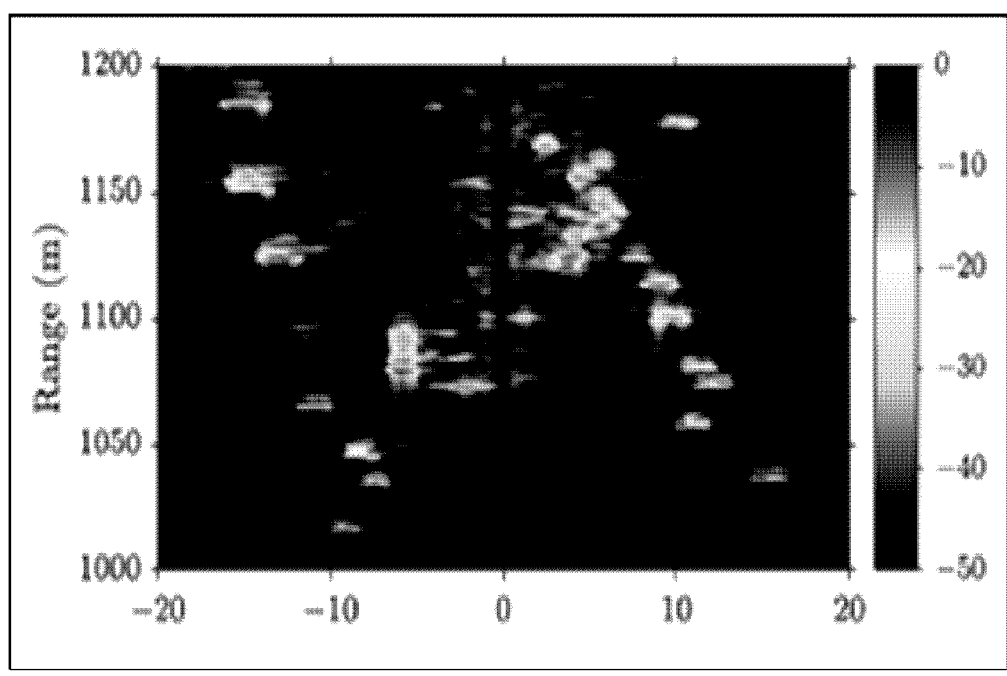
FIG. 5A is a diagram illustrating the radar range-Doppler response of a radar signal only.
Figure 5B:
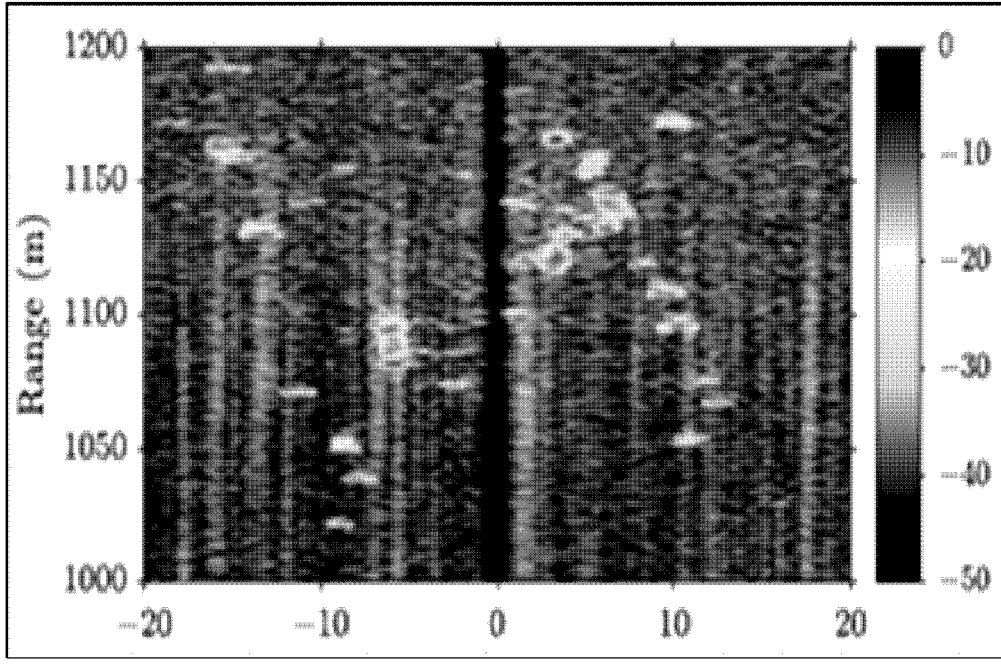
FIG. 5B is a diagram illustrating the radar range-Doppler response of a PARC waveform having a modulation index $h=\frac{1}{8}$ and a data rate of 2 Mb/s using a MF compensation transform.

FIGS. 5A and 5B show the range-Doppler response for two transmission cases, where FIG. 5A corresponds to a transmission case with no communications symbols, and thus traditional FMCW stretch processing; and FIG. 5B corresponds to a FMCW PARC transmission case with modulation index of h=⅛ and 2 Mb/s data rate for a total of $2\times10^5$ symbols transmitted in the CPI. The radar-only case illustrated in FIG. 5A was processed using standard FFT-based stretch processing while the case with the additional communication function illustrated in FIG. 5B was processed using a MF compensated transform, as described herein. Since the platform is stationary, the zero-Doppler clutter was removed using a simple projection and a Hamming window was applied across the pulses to lower the Doppler sidelobes.

The residual clutter due to the RSM effect, which is clearly visible in FIG. 5B, may be difficult to remove using typical clutter rejection methods. It is noted that coupled range-Doppler processing can also be applied to address the RSM at the cost of increased computational complexity. The RSM residue establishes an interference floor across Doppler that could result in false detections or masked targets. While there are methods to reduce the effect of RSM for pulsed emissions, this issue is a topic of ongoing research for waveform-diverse stretch processing. Thus, for the compensated transform approach disclosed herein, which may be characterized as a range-dependent matched filter, the effect of RSM may be more readily controlled through appropriate parameter selection for the communication function.

Figure 6A:
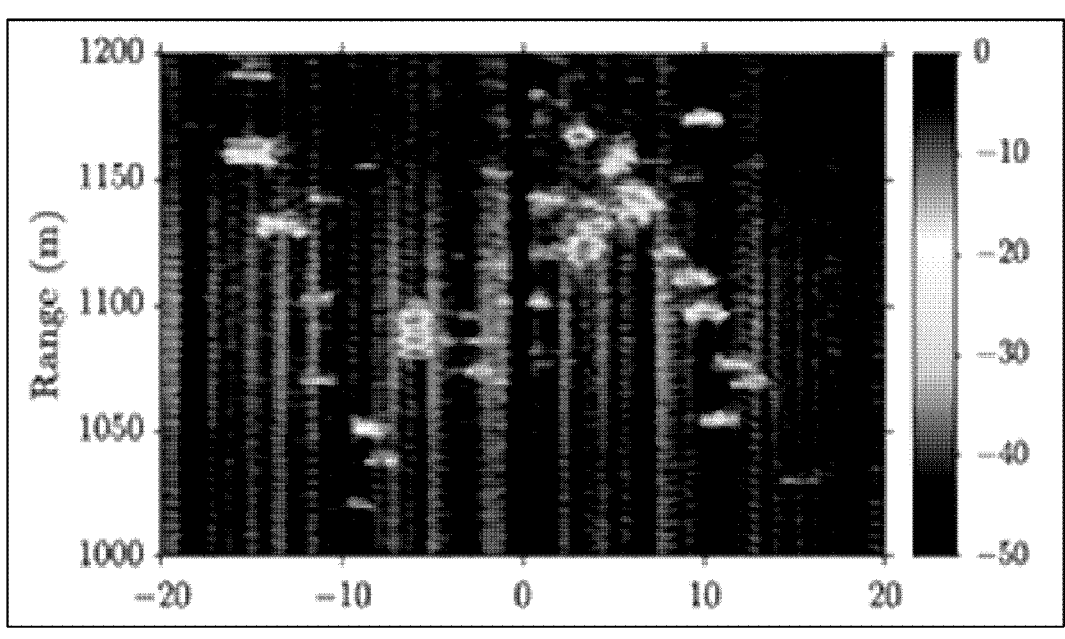
FIG. 6A is a diagram illustrating the radar range-Doppler response of a FMCW PARC waveform having a modulation index $h=\frac{1}{32}$ and a data rate of 2 Mb/s using a MF compensation transform.
Figure 6B:
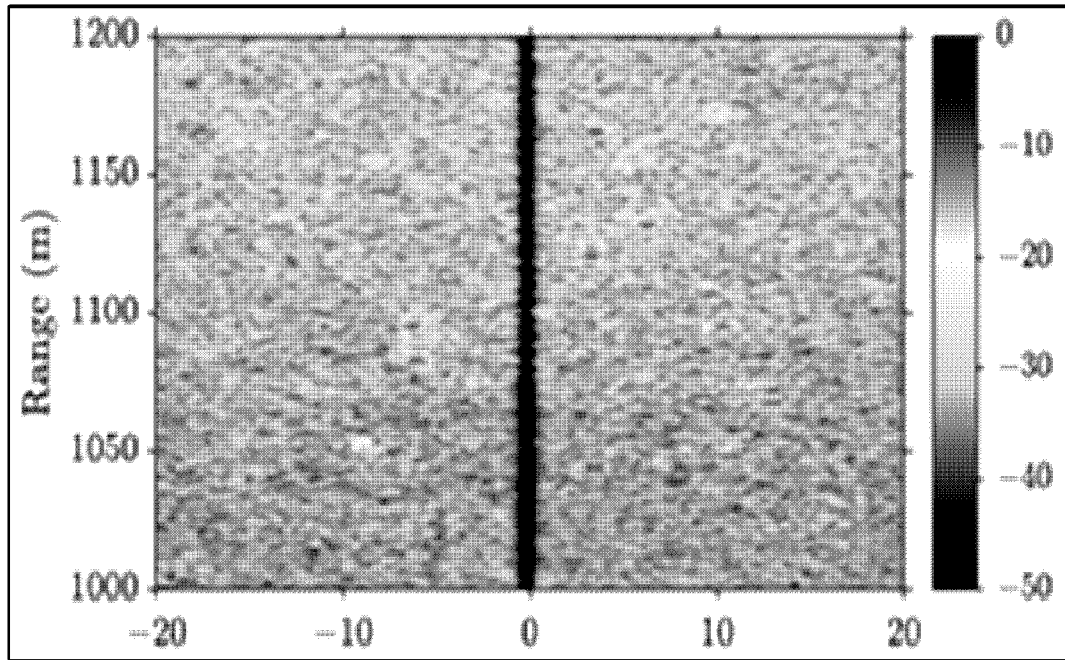
FIG. 6B is a diagram illustrating the radar range-Doppler response of a FMCW PARC waveform having a modulation index $h=\frac{1}{2}$ and a data rate of 2 Mb/s using a MF compensation transform.

FIGS. 6A and 6B show the range-Doppler responses for modulation indices of h=1/32 (FIG. 6A) and h=1/2 (FIG. 6B) while fixing the data throughput at 2 Mb/s. Matched filter compensation transforms were used for both FIGS. 6A and 6B. A decrease in modulation index from h=1/8 in FIG. 5B to h=1/32 in FIG. 6A corresponds to a smaller phase transition from symbol to symbol, and therefore a smaller deviation from the sawtooth sweep of the radar function resulting in less RSM. However, the effective communication SNR is approximately 12 dB lower for h=1/32 (FIG. 6A) than it is for h=1/8 (FIG. 5B). Thus, the improved radar performance with h=1/32 may be achieved at the expense of reduced communication performance in the form of higher BER. Conversely, the h=1/2 case (FIG. 6B) increases the deviation from the radar sawtooth wave resulting in significantly greater RSM.

Figure 7A:
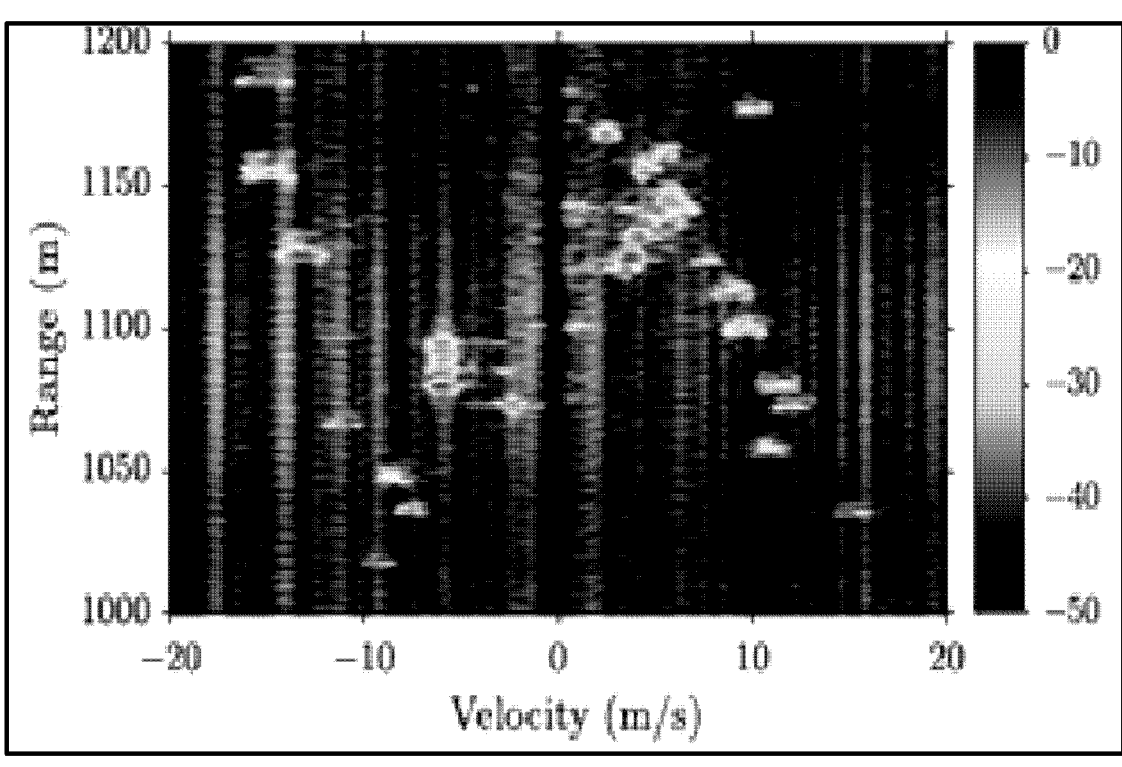
FIG. 7A is a diagram illustrating the radar range-Doppler response of a PARC waveform having a modulation index $h=\frac{1}{32}$ and a data rate of 500 Kb/s using a MF compensation transform.
Figure 7B:
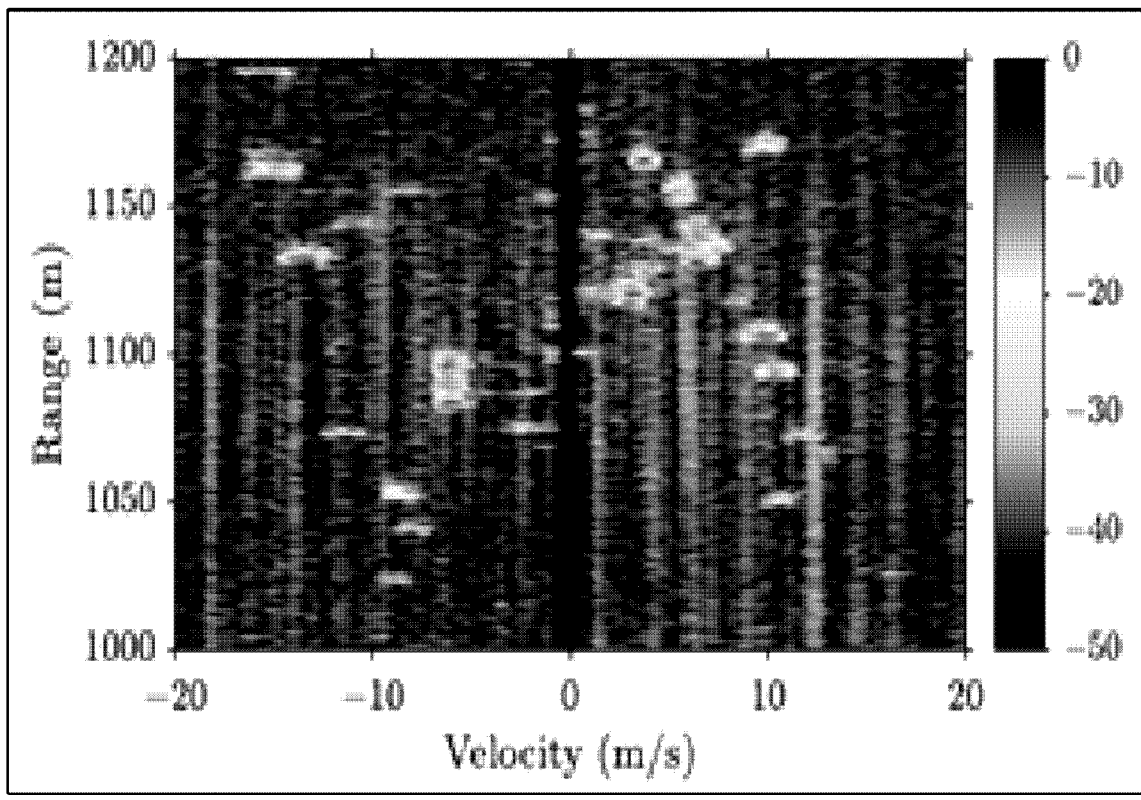
FIG. 7B is a diagram illustrating the radar range-Doppler response of a PARC waveform having a modulation index $h=\frac{1}{32}$ and a data rate of 8 Mb/s using a MF compensation transform.

Referring to FIGS. 7A and 7B, FMCW range-Doppler responses for FMCW PARC cases having a modulation index to h=1/32 and different data throughputs are shown. Matched filter compensation transforms were used for both FIGS. 7A and 7B. In FIG. 7A, a range-Doppler response for an FMCW PARC case for a data throughput of 500 Kb/s is shown. In FIG. 7B, a range-Doppler response for an FMCW PARC case for a data throughput of 8 Mb/s is shown. Compared to the 2 Mb/s case depicted in FIG. 6A, the increase (or decrease) of the data rate does not have a great impact on RSM. Nevertheless, comparing the FIGS. 7A, 6A, and 7B we observe that the RSM becomes less severe as data rate is decreased, the case of 500 Kbps shown in FIG. 7A resulting in the least severe RSM.

Figure 8:
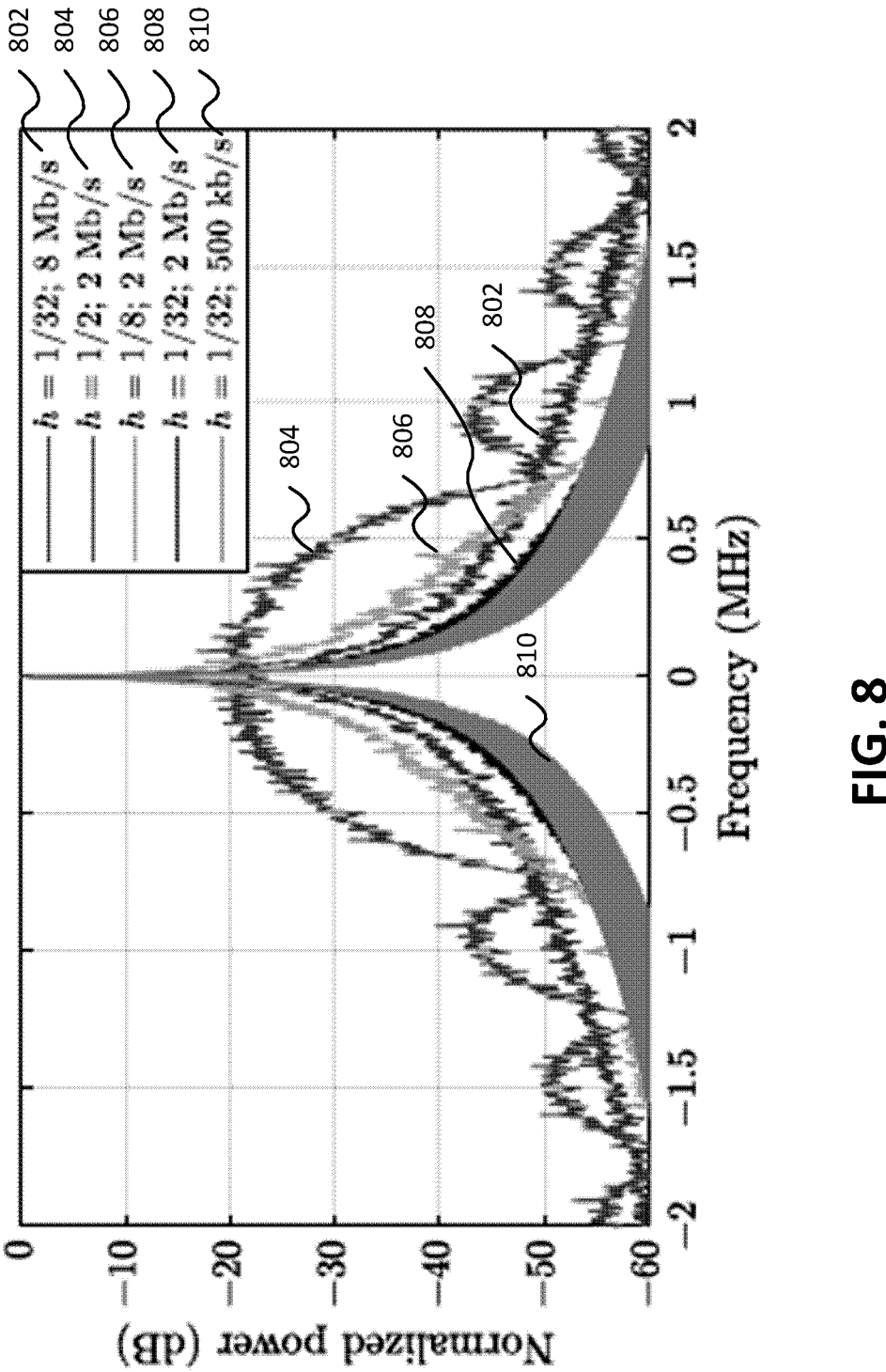
FIG. 8 is a diagram illustrating an estimated power spectra of just the communication component after reference mixing for various PARC parameter configurations.

The passband content of the FMCW PARC waveform can be viewed as a convolution between the radar and communication signal components in the frequency domain. Thus, after reference mixing and down-conversion, the resulting signal content may comprise a superposition of range dependent, frequency-shifted versions of the communication signal. This spectrum may be further compressed using the compensation transform. As explained above, the compensation transform may be generated by sampling responses at particular delays and collecting the determined sample responses into columns of a matrix. Referring to FIG. 8, a diagram illustrating an estimated power spectra of just the communication component after reference mixing for various PARC parameter configurations is shown. In FIG. 8, the estimated baseband power spectral densities (PSDs) for different communication scenarios were normalized to have equal average power. In FIG. 8, the following cases are illustrated: h=1/32 (8 MB/s) case 802, h=1/2 (2 MB/s) case 804, h=1/8 (2 MB/s) case 806, h=1/32 (2 MB/s) case 808, and h=1/32 (500 kB/s) case 810. As shown in FIG. 8, the h=1/2 case 804 occupies the largest bandwidth, and as the modulation index is decreased the PSD becomes more contained. Recall that the h=1/8 (2 Mb/s) case 806 and the h=1/32 (8 Mb/s) case 802 have the same maximum deviation of instantaneous frequency, though the h=1/8 case 806 has a larger spectral breadth than the h=1/32 case 802. While lowering h does increase the BER (for a fixed symbol rate), it also reduces RSM as seen in FIGS. 5A-7B.

As shown in FIGS. 3-8 and described above, the PARC framework may be extended for use in an FMCW mode so that higher data rates can be achieved. Due to the high bandwidths involved with the radar component, stretch processing may be utilized to reduce the bandwidth of the received signal prior to sampling. Additionally, unlike traditional stretch processing which uses a final FFT stage, the use of PARC in accordance with the present disclosure uses a compensated transform to address deviations from the reference signal, which may be present due to the introduction of the communication component. As with the pulsed PARC implementation, RSM may be found to worsen with increasing symbol rate and modulation index. Based on the power spectral densities after reference mixing, it has been observed that lower modulation indices exhibit better spectral containment which, in this context corresponds to less RSM degradation.

As explained above, the unique communication data in each sweep of FMCW PARC realizes a waveform-agile transmission mode in which the emitted waveform changes from sweep to sweep. Consequently, the clutter incurs a RSM effect that may hinder effective cancellation and takes the form of smearing across Doppler. While the compensated stretch processing described above with respect to FIGS. 3-8 enables correction for the SNR loss that occurs due to deviation of the emitted waveform from the reference signal, it may not adequately address this RSM degradation.

Below, a Least-Squares based compensation transform is proposed that provides a range-dependent mismatched filter (MMF) bank. The objective with this type of mismatched filtering is to bring the filter responses close to one another—despite the sweep-to-sweep changing waveform structure—by forcing a common desired response across all sweeps of the CPI. The optimal solution to forcing a particular desired solution was shown to be computationally infeasible, which motived development of the reduced-complexity approach presented below.

Taking Equations 6-18 into account, a complex baseband received signal during the ith sweep of a CPI may be expressed as:

$$y_i(t; x_i) = \Phi_{LPF}\{\Phi_{BPF}\{s_{ref}(t)\tilde{y}_i(t; x_i)\}\exp(-j2\pi f_{IF}t)\} \quad \text{(Equation 19)}$$

where $$x_i = \left[x_0, \ldots, x_{(i+1)N_c-1}\right]$$

is the associated symbol sequence, $\Phi_{BPF}\{\bullet\}$ and $\Phi_{LPF}\{\bullet\}$ represent the bandpass and lowpass filtering operations described above with reference to FIG. 13, respectively, and $$\tilde{y}_i(t; x_i) = s_i(t; x_i) * z_i(t) + u_i(t) \quad \text{(Equation 20)}$$

where $s_i(t;x_i)$ is the waveform transmitted during the ith sweep, $z_i(t)$ represents the scattering from the environment, and $u_i(t)$ is the noise process. The complex received signal of equation (8-Equation 37) may be sampled to obtain the vector:

$$y_i(x_i) = [y_i(\tau_{near}, x_i), \ldots, y_i(\tau_{near} + (L-1)T_s, x_i)]^T \quad \text{(Equation 21)}$$

where L is the number of received samples per sweep obtained by I/Q sampling the mixer output at $f_s$ samples/second, corresponding to the sampling period $T_s=1/f_s$. The near and far time delays are related to the near and far ends of the range swath as $\tau_{near}=2\tau_{near}/C$ and $\tau_{near}+(L-1)T_s=\tau_{far}$, for $\tau_{far}=2\tau_{far}/C$. The sampling rate satisfies $f_s>B_{IF}$ for sufficient fidelity, and is chosen such that $L=T_{sw}/T_s$ is an integer.

For a normalized point scatterer at range r during the ith sweep, the signal response (in the absence of noise) prior to sampling may be expressed as:

$$p_i(t, r; x_i) = \qquad \text{(Equation 22)}$$

$$\Phi_{LPF}\left\{\Phi_{BPF}\left\{s_{ref}(t)s\left(t - \frac{2r_a}{c}; x_i\right)\right\}\exp(-j2\pi f_{IF}t)\right\}.$$

Sampling this point response therefore yields:

$$p_i(r; x_i) = [p_i(\tau_{near}, r, x_i), \ldots, p_i(\tau_{near} + (L-1)T_s, r, x_i)]^T. \quad \text{(Equation 23)}$$

The range-dependent matched filter for range r is $$w_i(r; x_i) = \frac{p_i(r; x_i)}{\|p_i(r; x_i)\|_2} \qquad \text{(Equation 24)}$$

which even for fixed r changes from sweep to sweep according to the communication sequence $x_i$. The set of range-dependent matched filters in the ith sweep may be collected into the compensation matrix:

$$W_i(x_i) = [w_i(\tau_{near}, x_i), \ldots, w_i(\tau_{near} + (K-1)\delta r, x_i)] \quad \text{(Equation 25)}$$

where K is the number of samples in the range profile (a multiple of $F_{IF}T_{sw}$), and $\delta r$ represents the range spacing, which may be chosen to smaller than the range resolution $$\left(\text{i.e., } \frac{c}{2B}\right),$$

such that $r_{far}=r_{near}+(K-1)\delta r$. It follows that the range profile estimate in the ith sweep may be obtained by the matrix product:

$$\hat{z}_i = W_i^H(x_i)y_i(x_i). \qquad \text{(Equation 26)}$$

It is important to note that the filter bank $W_i(x_i)$ changes from sweep to sweep as the radar/communication waveform changes. A discretized representation of normalized scatter responses over the ranges of interest may be formed by using Equation (41) to collect these discretized ranges into the matrix, which may be expressed as:

$$P_i(x_i) = [p_i(r_{near}, x_i) \ldots p_i(r_{near} + (K-1)\delta r, x_i)]. \qquad \text{(Equation 27)}$$

From the description above, it can be seen that application of the compensation transform derived using Equation 43 yields a K×K matrix:

$$D_i(x_i) = W_i^H(x_i)P_i(x_i) \qquad \text{(Equation 28)}$$

which captures the mainlobe and sidelobe structure for each of these range-dependent matched filters. The mainlobe peak lies on the main diagonal of $D_i(x_i)$ and remains constant from sweep to sweep. Beyond the super/sub-diagonals close to the main diagonal that represent the mainlobe roll-off, the values of $D_i(x_i)$ will vary from sweep to sweep due to the changing structure of the PARC FMCW waveform. This range sidelobe modulation (RSM) effect, when imposed upon the clutter, incurs a loss of coherence that limits the efficacy of clutter cancellation.

To combat RSM within this FMCW context, the compensation matrix may be optimized to limit the sweep-to-sweep changes in the correlation response such that the desired output approximates:

$$W_i^H(x_i)P_i(x_i) \approx D_{dsr} \qquad \text{(Equation 29)}$$

for some constant desired response $D_{dsr}$. Determination of this mismatched filter (MMF) compensation transform can thus be formulated as an optimization problem:

$$W_{MMF,i} = \arg\min_W \left\|W^H P_i(x_i) - D_{dsr}\right\|_F^2, \qquad \text{(Equation 30)}$$

where $$\|\cdot\|_F^2$$

is the squared Frobenius norm. A good choice for $D_{dsr}$ may be the collection of responses for a FMCW waveform without the communication component, in which case:

$$D_{dsr} = AP_{LFM} \qquad \text{(Equation 31)}$$

where A is the unitary DFT matrix (i.e. $A^H A=I$, and $P_{LFM}$ is the matrix of responses from Equation 45 when s(t) is simply an up-chirped sawtooth LFM).

Unfortunately direct computation of $W_{MMF,i}$ via Equation 30 requires inverting the L×L matrix $$P_i(x_i)P_i^H(x_i)$$

in each sweep, which may be very large. For example, using the experimental results presented herein $W_{MMF,i}$ may have a size 25,000×25,000. Consequently, a reduced complexity approach is needed.

Instead of directly computing the entire MMF compensation transform, where each column represents a range-dependent mismatched filter, embodiments may utilize a two-step procedure that involves first determining the particular MMF for the alignment range, denoted as $W_{MMF,i}(r_a)$. Then by using the (approximate) time and frequency shifted structure of $P_i(x_i)$ all other range-dependent mismatched filters may be obtained by simply time-shifting $W_{MMF,i}(r_a)$ and multiplying by the discrete-time sinusoid corresponding to the relative range difference between the range of interest r and alignment range $r_a$.

Because $W_{MMF,i}(r_a)$ is a discrete sequence, time-shifting (and frequency-shifting) the filter may result in an aliasing of the time and frequency envelope(s). It may be beneficial to first estimate a continuous-time version of $W_{MMF,i}(r_a)$ (denoted $W_{MMF,i}(t;r_a)$) before time) and frequency shifting the filter, where $W_{MMF,i}(lT_s;r_a)=W_{MMF,i}(r_a)$ for l=0, 1, . . . , L−1. Once found, the ith filter corresponding to range $r=r_{near}+k\delta r$ for k=0, 1, . . . , K−1 may be expressed as:

$$w_{MMF,i}(t; r_{near} + k\delta r) = w_{MMF,i}(t - \tau_k; r_a)e^{j2\pi\tau_k \cdot (t-\tau_k)}, \quad \text{(Equation 32)}$$

where:

$$\tau_k = \frac{2(r_{near} + k\delta r - r_a)}{c}, \quad \text{(Equation 33)}$$

represents the relative delay between the backscatter from range $r=r_{near}+k\delta r$ and the alignment range $r_a$. Finally, $W_{MMF,i}(r=r_{near}+k\delta r)$ may be found by simply sampling the output of Equation 32 at $W_{MMF,i}(lT_s;r=r_{near}+k\delta r)$ for l=0, 1, . . . , L−1.

Determination of $W_{MMF,i}(r_a)$ may be achieved by:

$$w_{MMF,i}(r_a) = \arg\min_W \|w^H P_i(x_i) - d_{dsr}(r_a)\|_2^2 \quad \text{(Equation 34)}$$

where $d_{dsr}(r_a)$ is the row of $D_{dsr}$ associated with $W_{MMF,i}(r_a)$ in Equation 46. However, this approach may also invert $$P_i(x_i)P_i^H(x_i),$$

which may be a large matrix. Rather than inverting $$P_i(x_i)P_i^H(x_i), P_i(x_i)$$

may be compressed using a Discrete Fourier Transform (DFT) via:

$$\text{(Equation 35)}$$
$$P_i^H(x_i)w = P_i^H(x_i)A^H Aw = (AP_i(x_i))^H Aw = P_{F,i}^H(x_i)w_F$$

where $P_{F,i}(x_i)=AP_i(x_i)$ and $W_F=Aw$ are the Fourier transforms of $P_i(x_i)$ and w, respectively. Because a FMCW PARC waveform involves relatively small deviations from the baseline FMCW chirping structure, the transformed matrix $P_{F,i}(x_i)$ has most of its energy within a band centered on the main diagonal. The width of the band may depend on the bandwidth of the communication signal component, which may be determined using the equations above.

Figure 9:
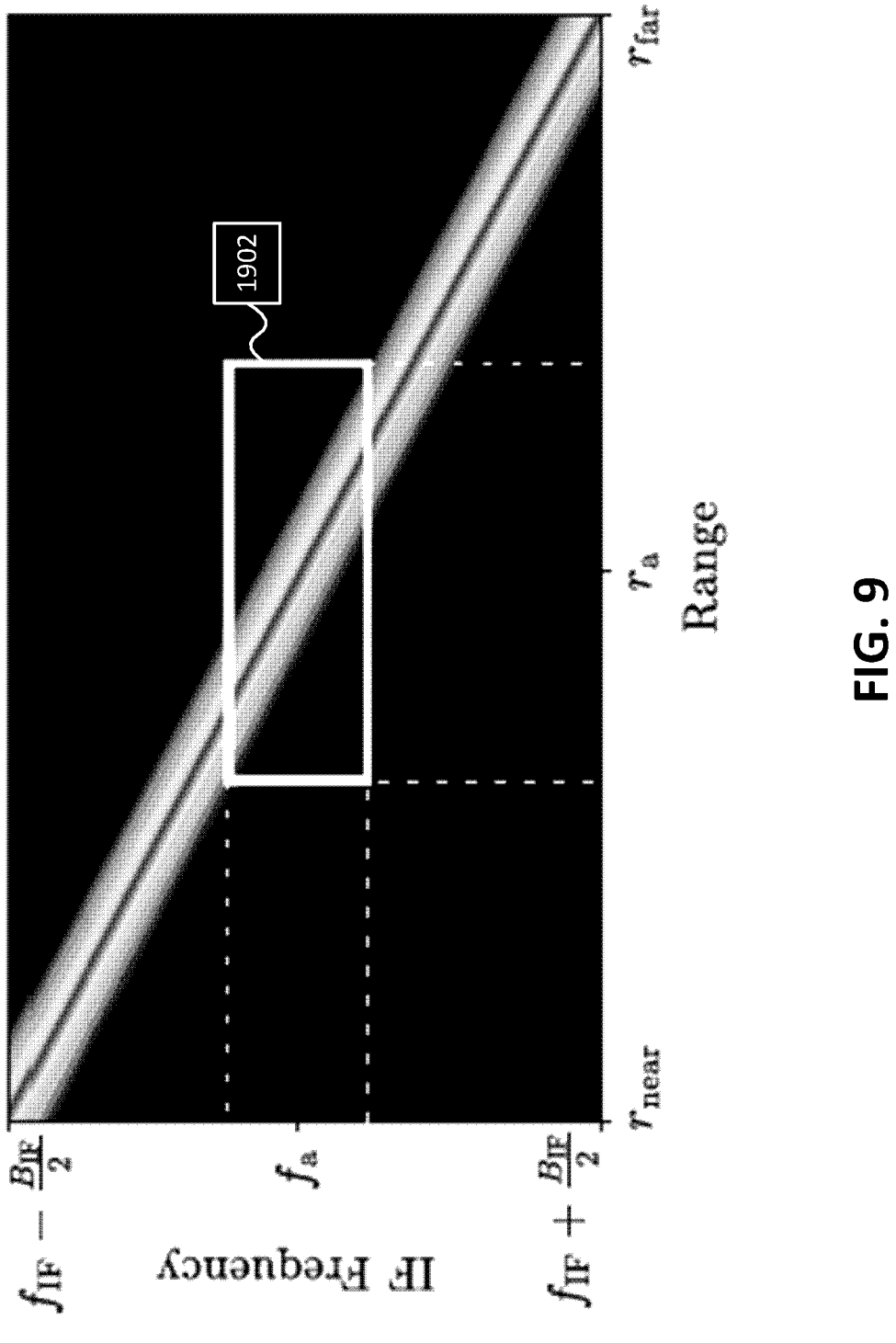
FIG. 9 is a diagram illustrating exemplary aspects of a partially compressed matrix for a PARC waveform.

By exploiting this banded structure the dimensionality of the matrix inverse may be reduced by selecting a submatrix corresponding to alignment range $r_a$ within the full matrix $P_{F,i}(x_i)$. To illustrate, consider an example where the communications bandwidth is 15% that of the IF bandwidth $B_{IF}$. In FIG. 9, a squared magnitude of $P_{F,i}(x_i)$ (in dB) is shown for this case. Note that for alignment range $r_a$, a majority of the energy is contained within the white box 902. Using an N×N matrix inversion, a lower dimensionality submatrix $\tilde{P}_{F,i}(x_i;r_a)$ with dimension N×M (for N<L and M<K) may be extracted and used to determine $W_{MMF,i}(r_a)$.

The submatrix $\tilde{P}_{F,i}(x_i;r_a)$ may be related to $P_{F,i}(x_i)$ as $$\tilde{P}_{F,i}(x_i; r_a) = U^T P_{F,i}(x_i)V \quad \text{(Equation 36)}$$

where U is a L×N matrix and V is a K×M matrix. These selection matrices may be constructed such that they extract $\tilde{P}_{F,i}(x_i;r_a)$ (e.g., the white box 902 in FIG. 9). Using the submatrix, equation (47) is approximated as:

$$\tilde{w}_{MMF,i}(r_a) = \arg\min_W \|w^H \tilde{P}_{F,i}(x_i; r_a) - \tilde{d}_{dsr}(r_a)\|_2^2 \quad \text{(Equation 37)}$$

where $\tilde{d}_{dsr}(r_a)=d_{dsr}(r_a)V$ is the 1×M reduced dimension desired response and $\tilde{W}_{MMF,i}(r_a)$ is the N×1 reduced dimension MMF (in the frequency domain). Once found, $\tilde{W}_{MMF,i}(r_a)$ can be converted into the time-domain via:

$$w_{MMF,i}(r_a) = A^H U\tilde{w}_{MMF,i}(r_a). \quad \text{(Equation 38)}$$

Similar to the experimental results discussed above, additional open-air measurements were collected from the FMCW PARC waveforms illuminating a traffic intersection in Lawrence, Kansas from the roof of Nichols Hall on the University of Kansas campus. The field of view and geometry for the experimental setup was similar to the view and geometry shown in FIG. 4. For example, two S-band parabolic dish antennas with half-power beamwidth 12.3° (beamwidth shown in FIG. 4) were used to simultaneously transmit the FMCW PARC waveforms and receive the backscattered data. The transmitted waveforms and reference signals were generated using a Tektronix AWG70002A arbitrary waveform generator, and the backscattered echoes (after stretch mixing/filtering) were captured using a Rohde and Schwarz FSW 26 real-time spectrum analyzer. It is noted that the results discussed and illustrated with respect to FIGS. 20-22 utilized mismatched filtering, as described above.

The instantaneous frequency of the radar function $f_r(t)$ for the transmitted FMCW PARC waveform followed a down-chirped sawtooth wave with starting and ending frequencies of 3.85 GHz and 3.35 GHz, respectively (B=500 MHz bandwidth), for a $T_{SW}$=500 μs sweep time and γ=1 MHz/μs chirp rate. The intermediate frequency was set to $f_{IF}$=300 MHz with $B_{IF}$=40 MHz bandwidth (range swath of Δr=6000 m). The near and far ranges were set to $r_{near}$=0 m and $r_{far}$=6000 m, respectively. The alignment range was chosen as $r_a$=1050 m ($f_a$=287 MHz) which coincides with the middle of the intersection. The received data were sampled at 50 MHz after mixing/filtering. A total of 200 sweeps were captured to form a CPI having a total duration of 100 ms. The stretch processing parameters were the same as the parameters shown in Table 1 above. To facilitate a fair comparison, all test cases were transmitted back-to-back to illuminate the same approximate scene.

Figure 10:
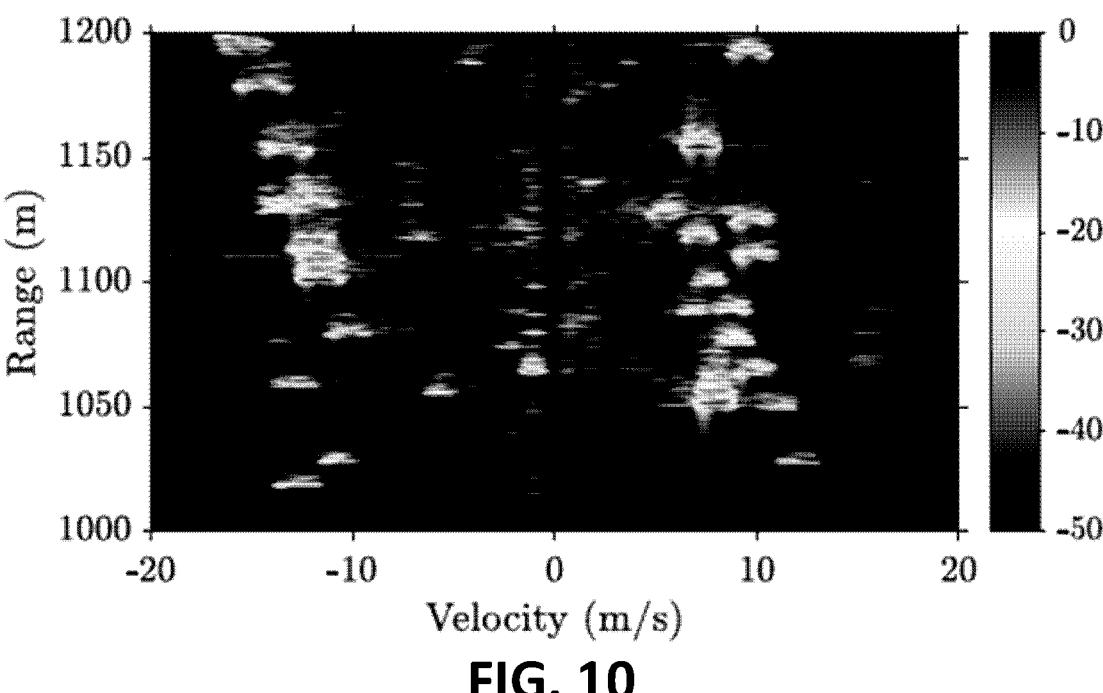
FIG. 10 is a diagram illustrating the radar range-Doppler response obtained using traditional FMCW stretch processing.
Figure 11:
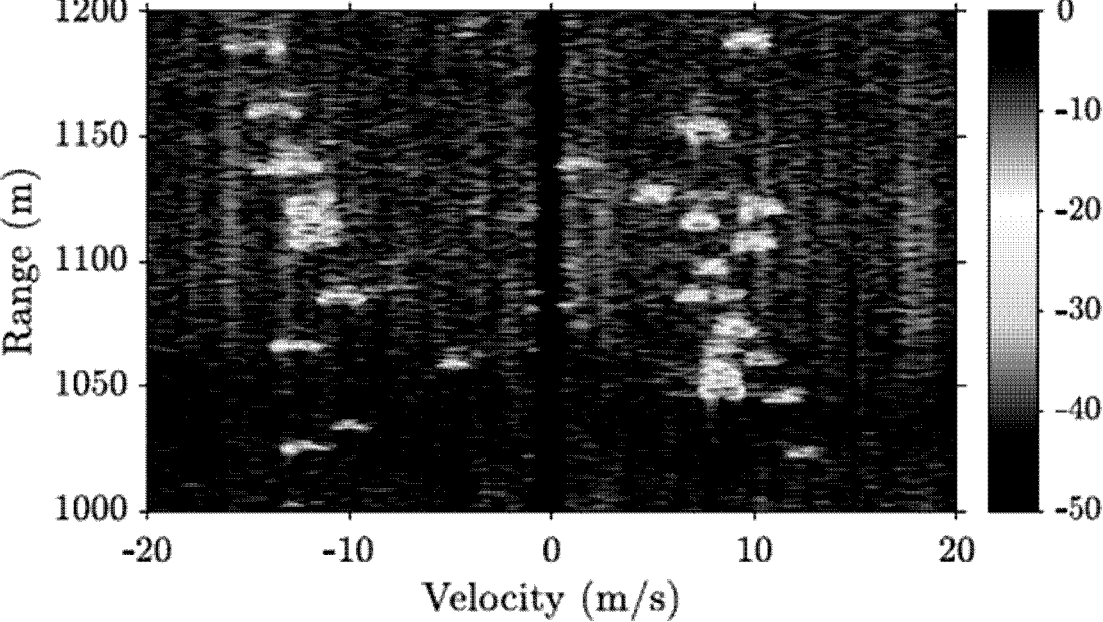
FIG. 11 is a diagram illustrating the radar range-Doppler response of a FMCW PARC waveform having a modulation index $h=\frac{1}{8}$ and a data rate of 8 Mb/s using a MF compensation transform.
Figure 12:
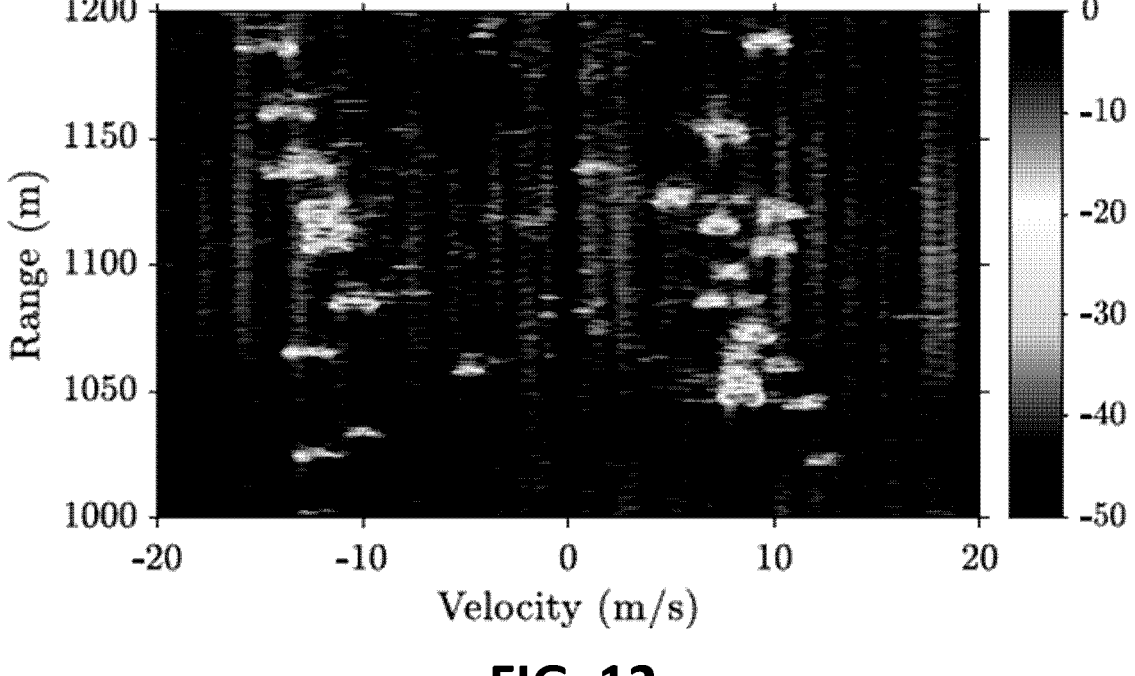
FIG. 12 is a diagram illustrating the radar range-Doppler response of a PARC waveform having a modulation index $h=\frac{1}{8}$ and a data rate of 8 Mb/s using a MMF compensation transform.

FIG. 10 shows the radar-only baseline case while FIGS. 11 and 12 show the range-Doppler responses for FMCW PARC with a modulation index of $h=\frac{1}{8}$ and 8 Mb/s data rate, for a total of $8 \times 10^5$ symbols transmitted in the 100 ms CPI. A raised-cosine shaping filter with duration $4T_c$ was used for g(t) from equation (9). FIG. 11 was generated using the (matched filter) compensation transform while FIG. 12 was obtained by applying an MMF compensation transform, as described above. In both cases the zero-Doppler clutter was suppressed using a simple projection and a Hamming window was used across the pulses to lower the Doppler sidelobes. While both cases to exhibit some RSM residue relative to the baseline case of FIG. 10, it is quite clear that the MMF approach shown in FIG. 12 substantially reduces this residue compared to the MF case shown in FIG. 11. Specifically, the average noise+residual clutter is approximately 5 dB lower in FIG. 12 than it is in FIG. 11, thus facilitating better target visibility. It is noted that mismatched filtering may enhance noise (also known as mismatch loss) compared to matched filtering. However, this 5 dB improvement subsumes the reduction in SNR due to noise enhancement.

As shown above, while pulsed versions of PARC provide a feasible means in which to incorporate a data stream into a high-power radar emission, FMCW PARC enables higher data rates to be achieved (e.g., due to the "always on" structure) while simultaneously facilitating a wideband radar capability through the use of a compensated form of stretch processing on receive. Additionally, it has been shown that the radar sidelobe modulation that naturally occurs when a baseline radar waveform is altered to include a communication capability may be accounted for via a compensated stretch processing approach that utilizes a reduced complexity Least-Squares formulation to realize a sequence of mismatched filter banks, which experimental measurements have shown provide a 5 dB improvement with respect to residual clutter suppression of 5 dB. Thus, FMCW PARC techniques utilizing mismatched filtering techniques according to the present disclosure may significantly improve target visibility while maintaining a data rate on the order of several Mbps. Additional exemplary aspects of utilizing stretch processing and techniques for optimizing stretch processing operations to enhance performance of a radar system and/or communication system processing data embedded in REC waveforms generated in accordance with aspects of the present disclosure are described in more detail in the Appendix filed concurrently herewith, the contents of which are incorporated herein by reference in their entirety.

Figure 13:
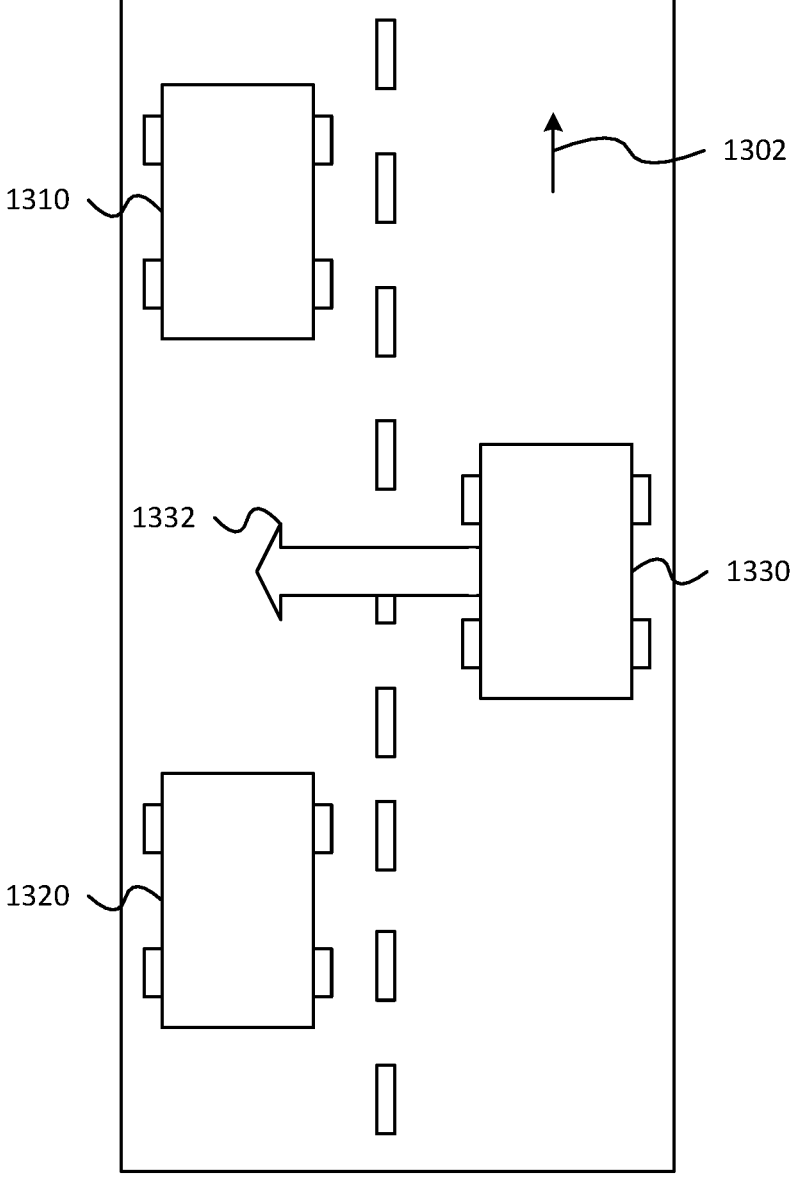
FIG. 13 is a block diagram illustrating an exemplary system for utilizing FMCW PARC to support operation of one or more autonomous vehicles in accordance with the present disclosure.

As explained above, the "always on" and constant-modulus nature of FMCW PARC allows both data throughput and energy on target to be maximized. Because of these properties, FMCW PARC may be readily deployed in various automotive applications to simultaneously support collision avoidance and vehicle-to-vehicle communication networks. For example and referring to FIG. 13, a block diagram illustrating an exemplary system for utilizing FMCW PARC to support operation of one or more autonomous vehicles is shown. In FIG. 13, a first vehicle 1310, a second vehicle 1320, and a third vehicle 2330 are shown. Each of the vehicles 1310, 1320, 1330 may include a navigation or control system that includes one or more dual-purpose radar-communication systems configured to utilize the FMCW PARC signaling techniques described above.

The navigation/control system may be configured to evaluate various data sets to make navigation decisions (e.g., based on simultaneously collected radar and data communication information). The navigation/control system may also dynamically modify a mode in which the dual-purpose radar-communication system operates based on the navigation decisions (e.g., to prioritize the radar detection capabilities at the expense of the simultaneously performed data communication capabilities or to prioritize the data communication capabilities at the expense of the simultaneously performed radar detection capabilities). For example, a first operating mode may be a radar detection mode in which the dual-purpose radar-communication system operates to prioritize performing radar detection of moving targets and other environmental factors (e.g., other objects or potential hazards) based FMCW PARC transmissions (e.g., at the expense of any simultaneously performed data communications processing), while a second operating mode may be a communication mode in which the dual-purpose radar-communication system operates to prioritize transmission of data embedded in radar waveform transmissions (e.g., at the expense of any simultaneously performed radar detection processing). As described above, operation of the radar-communication systems may be configured to dynamically modify various tuning parameters to prioritize radar detection capabilities (i.e., enhance the radar detection capabilities of the system) or to prioritize data communication capabilities (i.e., increase data rates, reduce BER, etc.). To illustrate, when the parameters are configured to prioritize radar detection capabilities (e.g., the first mode), the radar sensing capability of the navigation/control system may be improved while maintaining the ability to simultaneously transmit data with some minor performance loss to the data communications capability (e.g., higher BER and/or lower data rates). When the parameters are configured to prioritize the data communication capabilities (e.g., the second mode), the data communication capabilities of the navigation/control system may be improved (e.g., higher data rates) while maintaining the ability to simultaneously perform radar detection with some minor performance loss to the sensitivity of the radar sensing capabilities. In embodiments, the radar-communication system may include the radar and data communication system of FIGS. 1 and 2. Alternatively, the radar-communication system of FIGS. 1 and 2 may include the processing logic of FIG. 3, which enables FMCW PARC to be utilized, which may include processing received signals using matched filters or mismatched filters, as described above.

In embodiments, the navigation/control system may include one or more processors and a memory storing instructions that, when executed by the one or more processors, cause the one or more processors to perform operations for controlling navigation of a vehicle. Exemplary navigation operations may include controlling a speed of the vehicle (e.g., acceleration, deceleration, braking, etc.), controlling operations of a maneuvering system that controls a direction of travel for the vehicle (e.g., turning, forward, reverse, etc.), and the like. It is noted that the navigation/control system may be coupled to additional systems and functionality of a vehicle other than a radar-communication system. For example, the navigation/control system may be communicatively coupled to a propulsion system, such as an engine or device, suitable for facilitating forces that move the vehicle in a desired direction, a braking system that includes a mechanism or means for controllably decelerating the vehicle (e.g., brakes, flaps, and the like), a global positioning system (GPS) that facilitates determining a location of the vehicle and verifying a travelled route coincides with an intended path of travel (i.e., from a point of origin to a destination), and other systems that may facilitate operation of a vehicle during navigation.

As an illustrative example, while operating in the first mode, the radar-communication system may be configured to prioritize radar detection in order to sense environmental factors, such as other vehicles in the vicinity or objects (e.g., light posts, guard railings, cement dividers, etc.) that may impact the navigation of the vehicle. In the example illustrated in FIG. 13, the vehicles 1310, 1320, 1330 may be travelling in the direction indicated by arrow 1302. During radar detection operations, the radar-communication system of the third vehicle 1330 may detect the presence of the first vehicle 1310 and the second vehicle 1320 and provide information indicating the presence of these vehicles to the navigation/control system. The navigation/control system may be controlling navigation of the third vehicle 1330 based on a route determined from inputs provided by a user and/or from other systems (e.g., a GPS system, a map system or service, etc.), such as to navigate the vehicle from a point of origin (e.g., the user's home) to a destination (e.g., the user's place of employment). As part of the navigation control, the navigation/control system may determine that a lane change is appropriate. Based on the information received from the radar-communication system, the navigation/control system may determine that the vehicles 1310, 1320 are present and may impact the lane change operation.

To enable the lane change operation to be performed safely, the navigation/control system may automatically change the mode of the radar-communication system to the second mode in order to prioritize communication of information to the vehicles 1310, 1320 related to the intention of the third vehicle 1330 to change lanes. After transmitting the communication to the vehicles 1310, 1320, the third vehicle 1330 may return to the first operating mode (e.g., to prioritize radar detection capabilities) and continue performing radar detection operations in order to maintain appropriate knowledge of the environment surrounding the third vehicle 1330. Upon detecting the data transmission from the third vehicle 1330, the first vehicle 1310 and the second vehicle 1320 may evaluate the received data, which may provide an indication that the third vehicle 1330 intends to enter the lane in which the first vehicle 1310 and the second vehicle 1320 are travelling. As explained above, while operating in the first mode, the navigation/control system may continue to simultaneously monitor in radar waveforms for embedded data transmissions (e.g., from the other vehicles).

Navigation/control systems of the first vehicle 1310 and the second vehicle 1320 may process the received data to determine whether any navigation changes should be made with respect to the first vehicle 1310 and the second vehicle 1320. For example, the second vehicle 1320 may determine to slow down slightly and/or the first vehicle 1310 may determine to speed up slightly in order to create more space for the third vehicle 1330. After determining whether any modifications are to be made, the first vehicle 1310 and the second vehicle 1320 may control their respective radar-communication systems to operate in the second mode (i.e., a mode in which data communication is prioritized) and transmit data to the third vehicle 1330, such as to acknowledge reception of the data transmitted by the third vehicle 1330 regarding the lane change and to indicate any changes in the navigation of the first vehicle 1310 and the second vehicle 1320 to the other vehicles. It is noted that because the transmission of data using FMCW PARC techniques is a broadcast-type transmission, the data transmitted by the first vehicle 1310 may be received by the second vehicle 1320 and the third vehicle 1330, thereby informing those vehicles of the intentions of the first vehicle 1310, and the data transmitted by the second vehicle 1320 may be received by the first vehicle 1310 and the third vehicle 1330, thereby informing those vehicles of the intentions of the second vehicle 1320. Following the exchange of information between the vehicles 1310, 1320, the third vehicle 1330 may continue to perform radar detection operations and initiate the lane change upon detecting safe conditions for effecting the lane change, as indicated by arrow 1332. Additionally, it is noted that because of the dual use nature of the above-described dual-purpose radar-communication systems, each of the vehicles 1310, 1320, 1330 may transmit data while simultaneously performing radar detection operations and may, in some aspects, tune parameters of the system to more effectively transmit data (e.g., to increase the likelihood that the transmitted data is received by the other vehicles even is the other vehicles are simultaneously performing both radar sensing and data transmission).

As shown above, the ability to dynamically modify the mode of operations of the radar-communication system to prioritize data transmission or radar detection may enable improved communication between autonomous vehicles (e.g., by allowing data associated with modifications to the navigation of the vehicles to be communicated in a manner that is more likely to be received without error by other vehicles that may be performing radar sensing operations when the data is transmitted/received). Another advantage of the FMCW PARC techniques disclosed herein is the use of high power data transmissions, which enables detection of data communications by vehicles that may be more distant from the transmitting vehicle, allowing larger data communication networks to be formed between moving vehicles, which may allow navigation/control systems of vehicles to more effectively evaluate their surrounding environments and make decisions with respect to both navigation and collision avoidance. It is noted that the exemplary scenario described and illustrated in FIG. 13 is but one example of how the utilization of the concepts disclosed herein may be utilized to facilitate improved collision avoidance and communication between moving vehicles. However, the concepts disclosed herein may be readily adapted or utilized in other scenarios and for other applications. For example, the concepts disclosed herein may be utilized for autonomous and non-autonomous automobiles, various types of watercraft (e.g., boats, ships, etc.) and aerospace vehicles (e.g., planes, drones, helicopters, etc.), and other types of vehicles and systems for which both radar and communication capabilities may be desired.

Referring to FIG. 14, a flow diagram illustrating an exemplary method for performing radar detection using FMCW PARC radar-communication waveforms in accordance with embodiments is shown as a method 1400. In an embodiment, the steps of the method 1400 may be stored as instructions (e.g., the instructions 122 of FIG. 1 or the instructions 222 of FIG. 2) that, when executed by one or more processors (e.g., the one or more processors 110 of FIG. 1 or the one or more processors 210 of FIG. 2), cause the one or more processors to perform the steps of the method 1400.

As shown in FIG. 14, at step 1410, the method 1400 includes receiving, by at least one processor, an input radar waveform. As described above, the input radar waveform may be an embedded communication radar waveform, such as a FMCW PARC waveform, generated by in phase combining a continuous phase radar waveform and a continuous phase modulation (CPM) communication waveform comprising data. At step 1420, the method 1400 includes synchronizing, by the at least one processor, the input radar waveform to a clock associated with the at least one processor to produce a synchronized input radar waveform. At step 1430, the method 1400 includes multiplying, by the at least one processor, the synchronized input radar waveform with a reference signal to produce a modified input radar waveform. In an aspect, the synchronized input radar waveform may correspond to the received signal 302 of FIG. 3, the reference signal may correspond to the reference signal 304 of FIG. 3, and step 1430 may be performed as described above with respect to mixer 306.

At step 1440, the method 1400 includes generating, by the at least one processor, a first signal corresponding to a real component of the modified input radar waveform and a second signal corresponding to an imaginary component of the modified input radar waveform. In an aspect, the first signal and the second signal may be generated by band pass filtering the modified input radar waveform, as described above with reference to bandpass filter 308 of FIG. 3, and generating, by the at least one processor, a complex lowpass equivalent signal based on the modified input radar waveform subsequent to performing the band pass filtering. As described above, the complex lowpass equivalent signal may include the real component and the imaginary component and may be generated as described above with reference to mixers 314 and 316 of FIG. 3. Lowpass filtering of the real component and the imaginary component may be performed to produce a first signal corresponding to the lowpass filtered real component and a second signal corresponding to the lowpass filtered imaginary component. In an aspect, the lowpass filtering may be performed as described above with reference to lowpass filters 318 and 320 of FIG. 3, and the outputs of the lowpass filters 318 and 320 may be provided to a first analog-to-digital converter (e.g., analog-to-digital converter 322 of FIG. 3) and a second analog-to-digital converter (e.g., analog-to-digital converter 324 of FIG. 3).

At step 1450, the method 1400 includes performing, by the at least one processor, radar monitoring based on the input radar communication waveform and a compensation transform derived from samples of the first signal and the second signal. In an aspect, the radar monitoring may include sampling, by the at least one processor, the first signal and the second signal to generate the samples of the first signal and the second signal, as described above, such as with reference to FIG. 3 or Equations 22 and 23, and generating, by the at least one processor, the compensation transform based on the samples of the first signal and the second signal, which may be a matched filter, as described with reference to FIGS. 3-8, or may be a mismatched filter. When the compensation transform is a mismatched filter, the compensation transform may be generated by sampling the first signal and the second signal at one or more delays and collecting the sampled responses into columns of a matrix to generate the compensation transform, which may include: determining a first mismatched filter for an alignment range and deriving one or more additional range-dependent mismatched filters for one or more other ranges. The one or more additional range-dependent mismatched filters may be generated by time shifting the first mismatched filter by one or more time shifts to produce one or more time shifted filters and multiplying each of the one or more time shifted filters by a value corresponding to a relative range difference between the alignment range and a range of interest corresponding to a particular one of the one or more time shifted filters, as described above.

The method 1400 may include, at step 1460, outputting, by the at least one processor, radar data based on the radar monitoring. For example, as described above with reference to FIG. 13, radar operations may include detecting one or more targets of interest based on the radar waveform portion of the received radar waveform, and radar data associated with the one or more targets of interest may be output (e.g., to a display device). In an aspect, the method 1400 may include extracting, by the at least one processor, the CPM communication waveform from the synchronized input radar and processing, by the at least one processor, the extracted CPM communication waveform to obtain the data of the CPM communication waveform. For example, a radar-communication system may be configured to facilitate both radar detection operations and data reception via FMCW PARC waveforms. As explained above, such a system may be configured to dynamically tune operating parameters to prioritize radar detection capabilities or data communication capabilities depending on a particular operating mode of the radar-communication system. As explained above with reference to FIGS. 5A-12, aspects of using FMCW PARC radar-communication waveforms in accordance with the present disclosure may provide improved radar detection, mitigate the impact of range sidelobe effects caused by embedding data communications into radar waveforms, and facilitate dynamic prioritization of radar operations or data communication throughput depending on the particular configuration of the system parameters.

It is noted the various aspects of the method 1400 described above with reference to FIG. 14 have been provided for purposes of illustration, rather than by way of limitation, and that specific aspects of the method 1400, such as how the compensation transform is generated and whether the compensation transform is formed as a matched or mismatched filter, are described in more detail above. Thus, embodiments of the present disclosure may include additional specific implementation details described above with reference to FIGS. 1-13, and are not limited to the preceding paragraphs specific to FIG. 14.

Referring to FIG. 15, a flow diagram illustrating an exemplary method for performing data reception using FMCW PARC radar-communication waveforms in accordance with embodiments is shown as a method 1500. In an embodiment, the steps of the method 1500 may be stored as instructions (e.g., the instructions 222 of FIG. 2) that, when executed by one or more processors (e.g., the one or more processors 110 of FIG. 1 or the one or more processors 210 of FIG. 2), cause the one or more processors to perform the steps of the method 1400.

At step 1510, the method 1500 includes receiving, by at least one processor, an input radar waveform. As described above with reference to FIG. 2, the input radar waveform may be an embedded communication radar waveform generated by in phase combining a continuous phase radar waveform and a CPM communication waveform comprising data. In an aspect, the input radar waveform may be received at a data communication receiver, such as the data communication receiver 200 of FIG. 2. At step 1520, the method 1500 includes synchronizing, by the at least one processor, the input radar waveform to a clock associated with the at least one processor to produce a synchronized input radar waveform. At step 1530, the method 1500 may include extracting, by the at least one processor, the CPM communication waveform from the synchronized input radar waveform. In an aspect, the CPM communication waveform may be extracted by de-chirping the input radar waveform to produce a data communication waveform (e.g., the data communication waveform 204 of FIG. 2). At step 1540, the method 1500 includes processing, by the at least one processor, the extracted CPM communication waveform to obtain the data of the CPM communication waveform. As described above, processing the CPM communication waveform to obtain the data may include demodulation, sampling, synchronization, and other operations.

In an aspect, the steps of the methods 1400 and 1500 may be performed by a vehicle, as described above with reference to FIG. 13. For example, the vehicle may perform radar operations to detect nearby vehicles and other obstacles using the method 1400 and may utilize the method 1500 to perform vehicle-to-vehicle communication with other nearby vehicles. The ability to utilize radar waveforms of embodiments that include embedded data may enable such vehicles to perform radar operations while simultaneously communicating data to other nearby vehicles and systems, such as to notify nearby vehicles of intended navigation operations of the vehicle (e.g., changing lanes). As another example, a vehicle may detect an obstacle in its path of travel via the operations of the method 1400 and may transmit data to other vehicles (e.g., vehicles behind the vehicle, etc.) to notify those other vehicles of the obstacle, which may not be detectable by radar systems of the other vehicles due to interference, such as the presence of the vehicle in between those other vehicles and the obstacle. In some aspects, vehicles implementing embodiments of the present disclosure may include multiple radar systems (e.g., forward facing, rear facing, side facing, etc.) and may implement aspects of the methods 1400 and 1500 at each radar system independently and may tune parameters of the radar system's transmitter to prioritize transmitted REC waveforms for data transmission or radar processing (e.g., increasing data rates or reducing BER for the data communications at some expense to radar sensing capabilities or vice versa). For example, when an obstacle is detected in front of the vehicle, the rear facing radar system may be tuned for prioritized data transmission so that data related to the obstacle detection may be reliably relayed to vehicles behind the transmitting vehicle and the side and forward facing radar systems may be tuned to prioritize radar operations to improve obstacle detection capabilities, which may enable the vehicle to autonomously take evasive action to avoid a collision or alert the driver of detected obstacles. It is noted that such operations may be chained between multiple vehicles to allow other vehicles in the area to become aware of potential hazards that may not be detectable by their own radar systems. For example, if vehicles cars are travelling in the same lane some of those vehicles may not be able to detect obstacles that can be detected by the front vehicles due to interference caused by the other vehicles on the road. The front vehicle may transmit data indicating a potential obstacle (e.g., a car is rapidly slowing down ahead of the front vehicle) to the vehicle(s) behind it which may in turn transmit data to the other vehicles and so on, thereby enabling those vehicles to obtain additional data about potential road hazards that may not be detectable by their respective radar systems. It is noted that the examples described above have been provided for purposes of illustration, rather than by way of limitation and that the methods 1400 and 1500 are not limited to vehicle-to-vehicle communications or the specific applications of the methods 1400 and 1500 described immediately above. Instead, it is to be understood that the method 1400 and 1500 may also be used for other applications and implementations in accordance with the concepts disclosed herein. Moreover, it should be understood that while the parameters of the radar detection systems of embodiments may be tuned dynamically, such tuning is not a requirement and radar detection systems of embodiments may be configured to operate with a single set of parameters (i.e., without dynamic tuning) for performing simultaneous radar and data communication operations.

Although the embodiments of the present disclosure and their advantages have been described in detail, it should be understood that various changes, substitutions and alterations can be made herein without departing from the spirit and scope of the disclosure as defined by the appended claims. Further, although the drawings may illustrate some of the concepts disclosed herein as logical or functional blocks, it is to be understood that each of those blocks may be implemented in hardware, software, or a combination of hardware and software. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for receiving data embedded in radar waveform transmission, the method comprising:
   receiving, by at least one processor, an input radar waveform, wherein the input radar waveform comprises an embedded communication radar waveform generated by in phase combining a continuous phase radar waveform and a continuous phase modulation (CPM) communication waveform comprising data;
   synchronizing, by the at least one processor, the input radar waveform to a clock associated with the at least one processor to produce a synchronized input radar waveform, the synchronizing determining a synchronization timing associated with the input radar waveform;
   extracting, by the at least one processor, the CPM communication waveform from the synchronized input radar waveform, wherein the extracting includes performing a de-chirp process on the synchronized input radar waveform based on the synchronization timing to extract the CPM communication waveform; and
   processing, by the at least one processor, the extracted CPM communication waveform to obtain the data of the CPM communication waveform.

2. The method of claim 1, wherein the synchronizing further comprises determining a frequency offset of the input radar waveform.

3. The method of claim 1, wherein extracting the CPM communication waveform from the input radar waveform comprises combining the input radar waveform with a complex conjugate of a known radar waveform.

4. The method of claim 1, wherein processing the extracted CPM communication waveform to obtain the data of the CPM communication waveform comprises demodulating the CPM communication waveform.

5. The method of claim 1, wherein the extracting further comprises applying a compensation transform to the synchronized input radar waveform, the compensation transform comprising a matched filter or a mismatched filter derived from samples of the synchronized input radar waveform, wherein the samples of the synchronized input radar waveform are sampled at one or more delays, and wherein sampled responses are collected into columns of a matrix to generate the compensation transform.

6. A system for receiving data embedded in radar waveform transmission, the system comprising:

a receiver configured to:

receive an input radar waveform, wherein the input radar waveform comprises an embedded communication radar waveform generated by in phase combining a continuous phase radar waveform and a continuous phase modulation (CPM) communication waveform comprising data;

synchronize the input radar waveform to a clock associated with at least one processor to produce a synchronized input radar waveform, wherein to synchronize the input radar waveform includes to determine a synchronization timing associated with the input radar waveform;

extract the CPM communication waveform from the synchronized input radar waveform based on a known radar waveform associated with the continuous phase radar waveform, wherein to extract includes to perform a de-chirp process on the synchronized input radar waveform based on the synchronization timing to extract the CPM communication waveform; and process the extracted CPM communication waveform to obtain the data of the CPM communication waveform; and a memory communicatively coupled to the at least one processor.

7. The system of claim 6, wherein the synchronizing further comprises determining a frequency offset of the input radar waveform.

8. The system of claim 6, wherein extracting the CPM communication waveform from the input radar waveform comprises combining the input radar waveform with a complex conjugate of the known radar waveform.

9. The system of claim 6, wherein processing the extracted CPM communication waveform to obtain the data of the CPM communication waveform comprises demodulating the CPM communication waveform.

10. The system of claim 6, wherein the receiver is integrated in a vehicle.

11. A non-transitory computer-readable storage medium storing instructions that, when executed by one or more processors, cause the one or more processors to perform operations for receiving data embedded in radar waveform transmission, the operations comprising:

receiving, by at least one processor, an input radar waveform, wherein the input radar waveform comprises an embedded communication radar waveform generated by in phase combining a continuous phase radar waveform and a continuous phase modulation (CPM) communication waveform comprising data;

synchronizing, by the at least one processor, the input radar waveform to a clock associated with the at least one processor to produce a synchronized input radar waveform, the synchronizing determining a synchronization timing associated with the input radar waveform;

extracting, by the at least one processor, the CPM communication waveform from the synchronized input radar waveform based on a known radar waveform associated with the continuous phase radar waveform, wherein the extracting includes performing a de-chirp process on the synchronized input radar waveform based on the synchronization timing to extract the CPM communication waveform; and processing, by the at least one processor, the extracted CPM communication waveform to obtain the data of the CPM communication waveform.

12. The non-transitory computer-readable storage medium of claim 11, wherein the synchronizing further comprises determining a frequency offset of the input radar waveform.

13. The non-transitory computer-readable storage medium of claim 11, wherein extracting the CPM communication waveform from the input radar waveform comprises combining the input radar waveform with a complex conjugate of the known radar waveform.

14. The non-transitory computer-readable storage medium of claim 11, wherein processing the extracted CPM communication waveform to obtain the data of the CPM communication waveform comprises demodulating the CPM communication waveform.

15. A method for performing radar detection using radar-communication waveforms, the method comprising:

receiving, by at least one processor, an input radar waveform, wherein the input radar waveform comprises an embedded communication radar waveform generated by in phase combining a continuous phase radar waveform and a continuous phase modulation (CPM) communication waveform comprising data;

synchronizing, by the at least one processor, the input radar waveform to a clock associated with the at least one processor to produce a synchronized input radar waveform, the synchronizing determining a synchronization timing associated with the input radar waveform;

multiplying, by the at least one processor, the synchronized input radar waveform with a reference signal to produce a modified input radar waveform, wherein the multiplying is performed based on the synchronization timing to produce the modified input radar waveform;

generating, by the at least one processor, a first signal corresponding to a real component of the modified input radar waveform and a second signal corresponding to an imaginary component of the modified input radar waveform;

performing, by the at least one processor, radar monitoring based on an input radar waveform and a compensation transform derived from samples of the first signal and the second signal; and outputting, by the at least one processor, radar data based on the radar monitoring.

16. The method of claim 15, further comprising:

sampling, by the at least one processor, the first signal and the second signal to generate the samples of the first signal and the second signal; and generating, by the at least one processor, the compensation transform based on the samples of the first signal and the second signal.

17. The method of claim 15, further comprising:

band pass filtering the modified input radar waveform;

generating a complex lowpass equivalent signal based on the modified input radar waveform subsequent to performing the band pass filtering, wherein the complex lowpass equivalent signal comprises the real component of the modified input radar waveform and the imaginary component of the modified input radar waveform; and performing, by the at least one processor, lowpass filtering of the real component and the imaginary component to produce the first signal and the second signal.

18. The method of claim 15, wherein the first signal and the second signal are sampled at one or more delays, and wherein sampled responses are collected into columns of a matrix to generate the compensation transform.

19. The method of claim 15, wherein generating the compensation transform comprises:

determining a first mismatched filter for an alignment range; and deriving one or more additional range-dependent mismatched filters for one or more other ranges by:

time shifting the first mismatched filter by one or more time shifts to produce one or more time shifted filters; and multiplying each of the one or more time shifted filters by a value corresponding to a relative range difference between the alignment range and a range of interest corresponding to a particular one of the one or more time shifted filters.

20. The method of claim 15, further comprising:

extracting, by the at least one processor, the CPM communication waveform from the synchronized input radar waveform; and processing, by the at least one processor, the extracted CPM communication waveform to obtain the data of the CPM communication waveform.

\*　\*　\*　\*　\*